United States Patent [19]

Hirose

[11] Patent Number: 5,321,831
[45] Date of Patent: Jun. 14, 1994

[54] MULTIPLE USER ELECTRONIC FILING SYSTEM FOR IMAGE DATA USING A KEYED HIERARCHICAL FILE STRUCTURE

[75] Inventor: Kenji Hirose, Yokohama, Japan

[73] Assignee: Kabushiki Kaisha Toshiba, Kawasaki, Japan

[21] Appl. No.: 606,074

[22] Filed: Oct. 30, 1990

[30] Foreign Application Priority Data

Oct. 30, 1989 [JP] Japan .................................. 1-282309

[51] Int. Cl.⁵ ...................... G06F 15/40; G06F 15/403; G06F 15/62; G06F 15/409
[52] U.S. Cl. ................................. 395/600; 364/282.3; 364/283.2; 364/284.4; 364/DIG. 1; 364/228.4; 364/962.1; 364/963; 395/425; 395/200
[58] Field of Search ............... 395/600, 800, 200, 425; 364/419

[56] References Cited

U.S. PATENT DOCUMENTS

| | | | |
|---|---|---|---|
| 4,601,003 | 7/1986 | Yoneyama et al. | 364/518 |
| 4,918,588 | 4/1990 | Barrett et al. | 364/200 |
| 4,928,234 | 5/1990 | Kitamura et al. | 364/200 |
| 5,146,600 | 9/1992 | Sugiura | 395/800 |

Primary Examiner—Thomas C. Lee
Assistant Examiner—J. Choules
Attorney, Agent, or Firm—Finnegan, Henderson, Farabow, Garrett & Dunner

[57] ABSTRACT

A central control apparatus and a plurality of terminal apparatuses are connected through a line. In the central control apparatus, a plurality of images are stored in an optical disk in accordance with a hierarchical structure having four hierarchical levels of cabinet, binder, document, and page, and retrieval information constituted by a plurality of keys each for retrieving a corresponding image is stored in a magnetic disk with different title structures (key structures) in units of binders. A desired image is retrieved from the optical disk in accordance with designation of the retrieval information stored in the magnetic disk. A metabinder having a plurality of binders having the same title structure of the retrieval information has a level higher than that of the cabinet. In the central control apparatus, a title table group of the metabinders is stored in the magnetic disk independently of the binders. When an image is to be retrieved in the central control apparatus or a terminal apparatus, the title table group of the metabinders stored in the magnetic disk is retrieved.

13 Claims, 22 Drawing Sheets

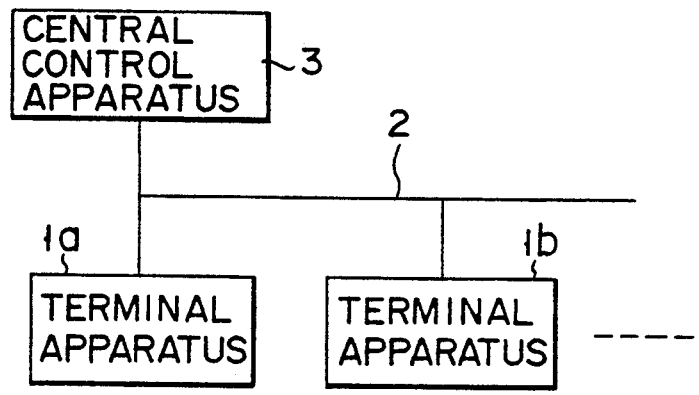
F I G. 1
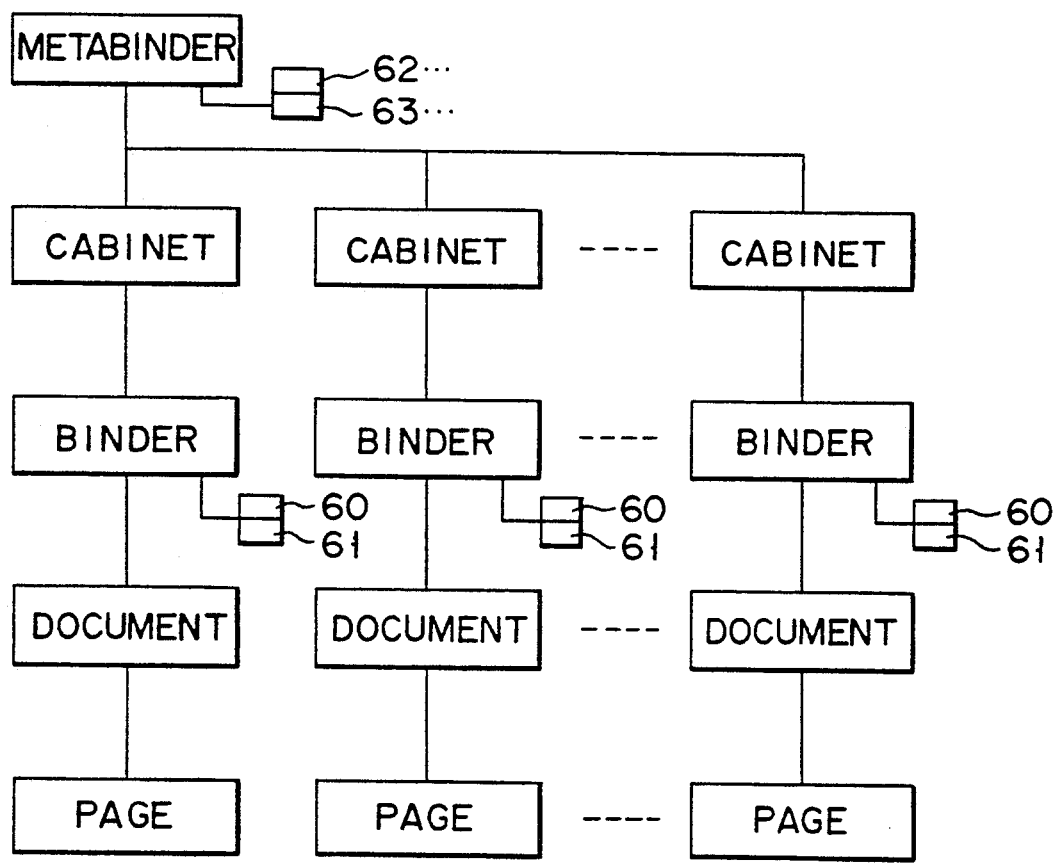
F I G. 3

|  | KEY 1 | KEY 2 |
|---|---|---|
| TITLE NO. | POSITION | NAME |
| 1 | YDF | HIROSE |
| 2 | YDF | MIYAZAKI |
| ⋮ | ⋮ | ⋮ |

~60

F I G. 4

| TITLE NO. | PAGE NO. | RECORD NO. | STORAGE ADDRESS | DOCUMENT SIZE |
|---|---|---|---|---|
| 1 | 1 | 1 | 0 | A4 |
| 1 | 2 | 2 | 100 | A5 |
| 2 | 1 | 3 | 150 | B4 |
| ⋮ | ⋮ | ⋮ | ⋮ | ⋮ |

61

F I G. 5

| BINDER NO. | KEY NO. | KEY ATTRIBUTE | LENGTH | KEY NAME |
|---|---|---|---|---|
| 1 | 1 | 0 | | |
| 1 | 2 | 0 | | |
| 1 | 3 | 1 | | |
| 1 | 4 | 2 | | |
| 11 | 1 | 0 | 10 | KEY 1 |
| 11 | 2 | 1 | 15 | KEY 2 |
| 12 | 1 | 0 | 10 | KEY 1 |
| 12 | 2 | 1 | 15 | KEY 2 |
| 2 | 1 | 0 | 10 | KEY 1 |
| 2 | 2 | 1 | 15 | KEY 2 |
| ⋮ | ⋮ | ⋮ | ⋮ | ⋮ |

| a | b | c | d | e | f | g | h | i | j | k |
|---|---|---|---|---|---|---|---|---|---|---|
| BINDER/ METABINDER NO. | BINDER/ METABINDER TYPE | BINDER NAME / METABINDER NAME | TITLE STRUCTURE CHANGE ATTRIBUTE | TITLE TABLE PRESENCE/ ABSENCE AND LOCATION | PAGE TABLE PRESENCE/ ABSENCE AND LOCATION | UP-DATA ATTRIBUTE | AUTOMATIC DELETE ATTRIBUTE | INTRATITLE KEY NUMBER | DATA | TITLE STORAGE ARRANGEMENT |
| 1 | 0 |  | 2 | 1 | 1 | 2 | 1 | 2 | 89.1.1 | 1 |
| 2 | 0 |  | 0 | 1 | 1 | 1 | 0 | 2 | 89.1.1 | 1 |
| ---- | ---- | ---- | ---- | ---- | ---- | ---- | ---- | ---- | ---- | ---- |
| 8 | 0 |  | 1 | 2 | 2 | 2 | 1 | 2 | 89.1.1 | 1 |
|  |  |  |  |  |  |  |  |  |  |  |
| 11 | 2 |  | 0 | 1 | 1 | 1 | 0 | 2 | 89.1.1 | 0 |
| 12 | 2 |  | 0 | 1 | 1 | 1 | 0 | 2 | 89.1.1 | 0 |

| a | b | c | d | e | f | g | h | i | j | k |
|---|---|---|---|---|---|---|---|---|---|---|
| BINDER/ META-BINDER NO. | BINDER/ META-BINDER TYPE | BINDER NAME/ META-BINDER NAME | TITLE STRUCTURE CHANGE ATTRIBUTE | TITLE TABLE PRESENCE/ABSENCE AND LOCATION | PAGE TABLE PRESENCE/ABSENCE AND LOCATION | UP-DATA ATTRIBUTE | AUTOMATIC DELETE ATTRIBUTE | INTRA-TITLE KEY NUMBER | DATA | TITLE STORAGE ARRANGEMENT |
| 1 | 0 |  | 2 | 1 | 1 | 2 | 1 | 2 | 89.1.1 | 1 |
| 2 | 0 |  | 0 | 1 | 1 | 1 | 0 | 3 | 89.1.1 | 1 |
| ---- | ---- | ---- | ---- | ---- | ---- | ---- | ---- | ---- | ---- | ---- |
| 8 | 0 |  | 1 | 2 | 2 | 2 | 1 | 2 | 89.1.1 | 1 |
| 11 | 2 |  | 0 | 1 | 1 | 1 | 0 | 3 | 89.1.1 | 0 |
| 12 | 2 |  | 0 | 1 | 1 | 1 | 0 | 3 | 89.1.1 | 0 |

FIG. 10

| TITLE NO. | KEY 1 POSITION | KEY 2 NAME | KEY 3 |
|---|---|---|---|
| 1 | YDF | HIROSE | |
| 2 | YDF | MIYAZAKI | |
| ⋮ | ⋮ | ⋮ | ⋮ |

| BINDER NO. | KEY NO. | KEY ATTRIBUTE | LENGTH | KEY NAME |
|---|---|---|---|---|
| 1 | 1 | 0 | | |
| 1 | 2 | 0 | | |
| 1 | 3 | 1 | | |
| 1 | 4 | 2 | | |
| 11 | 1 | 0 | 10 | KEY 1 |
| 11 | 2 | 1 | 15 | KEY 2 |
| 12 | 1 | 0 | 10 | KEY 1 |
| 12 | 2 | 1 | 15 | KEY 2 |
| 2 | 1 | 0 | 10 | KEY 1 |
| 2 | 2 | 1 | 15 | KEY 2 |
| 2 | 3 | 2 | 10 | KEY 3 |
| 11 | 3 | 2 | 10 | KEY 3 |
| 12 | 3 | 2 | 10 | KEY 3 |
| ⋮ | ⋮ | ⋮ | ⋮ | ⋮ |

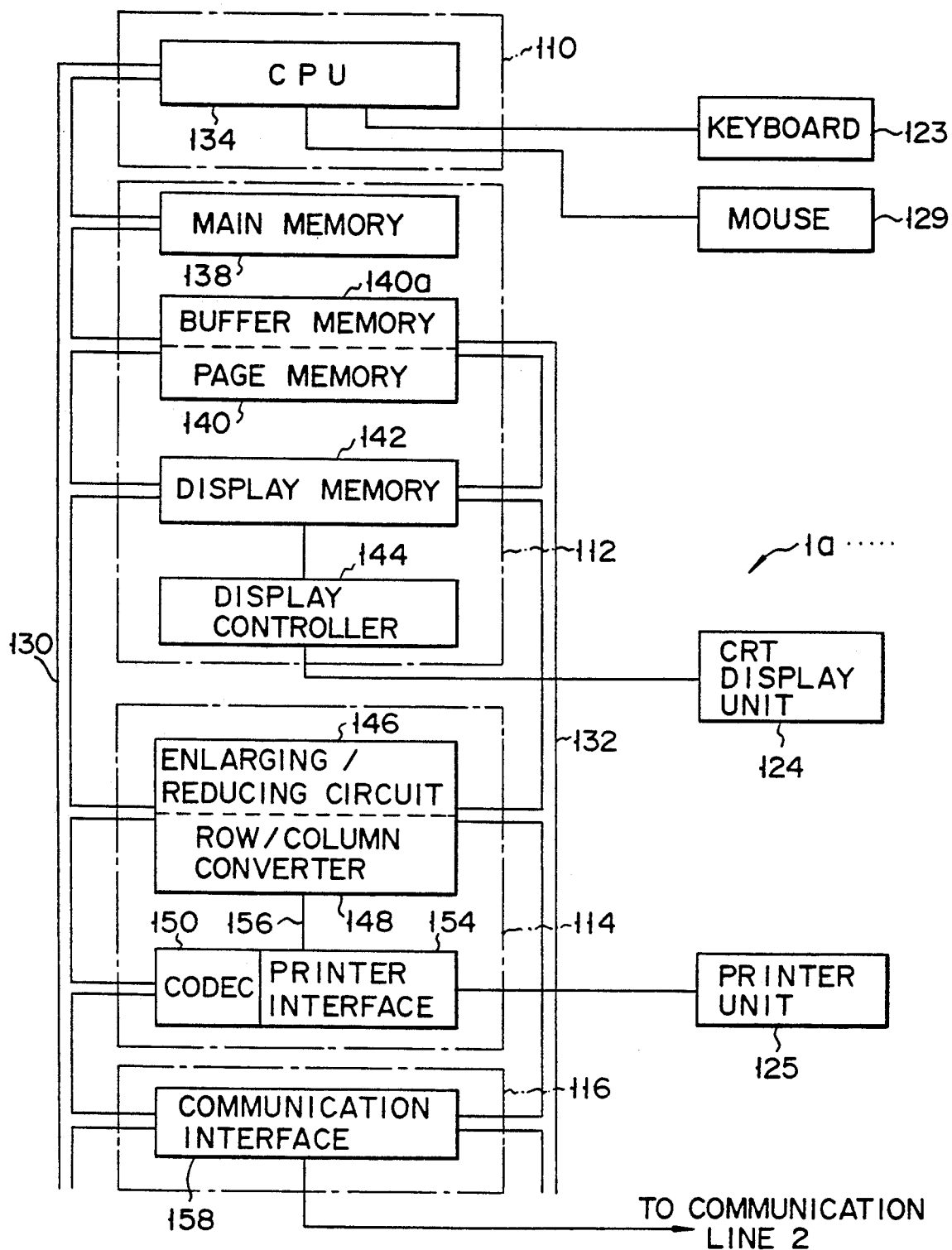
F I G. 13

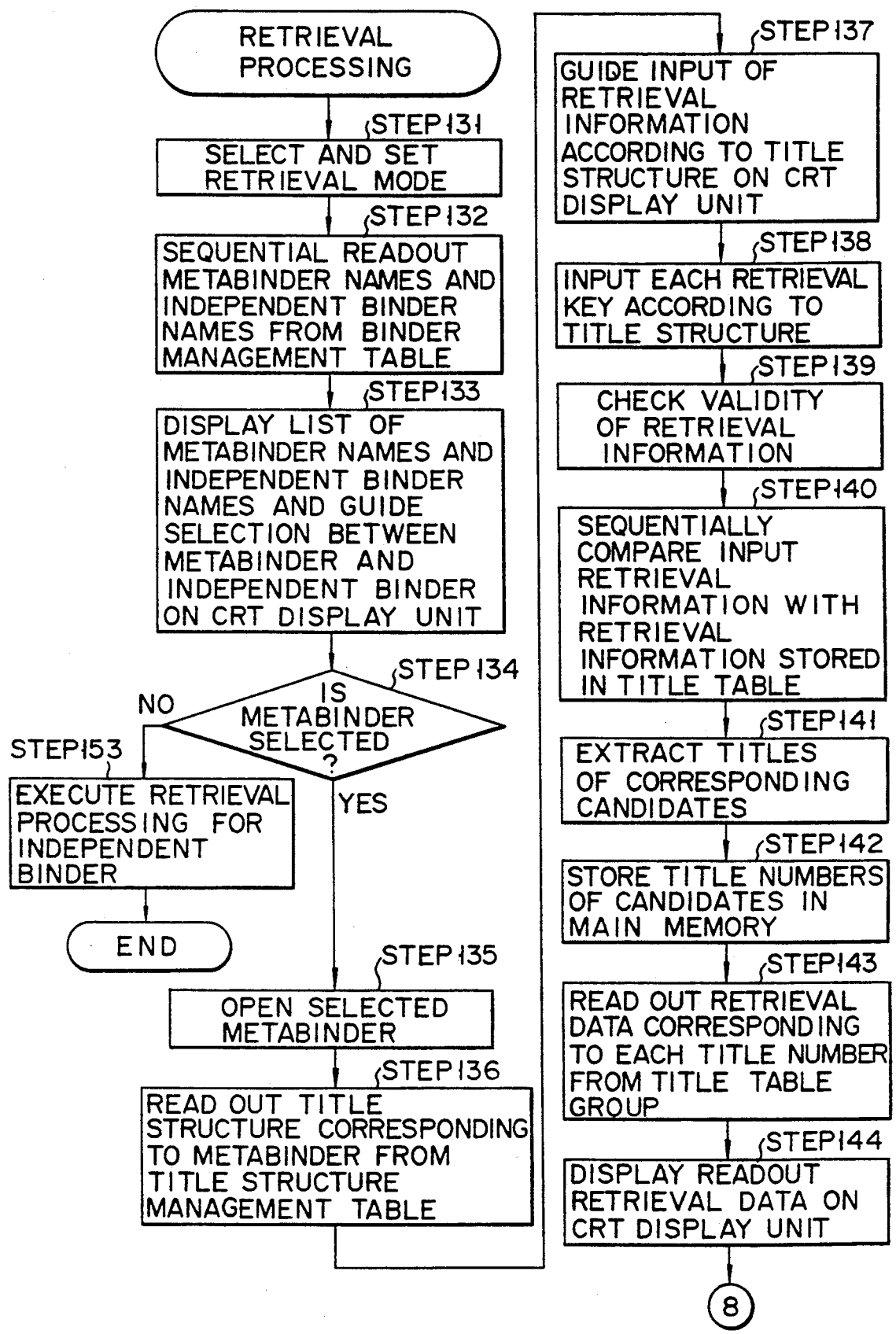
F I G. 16A

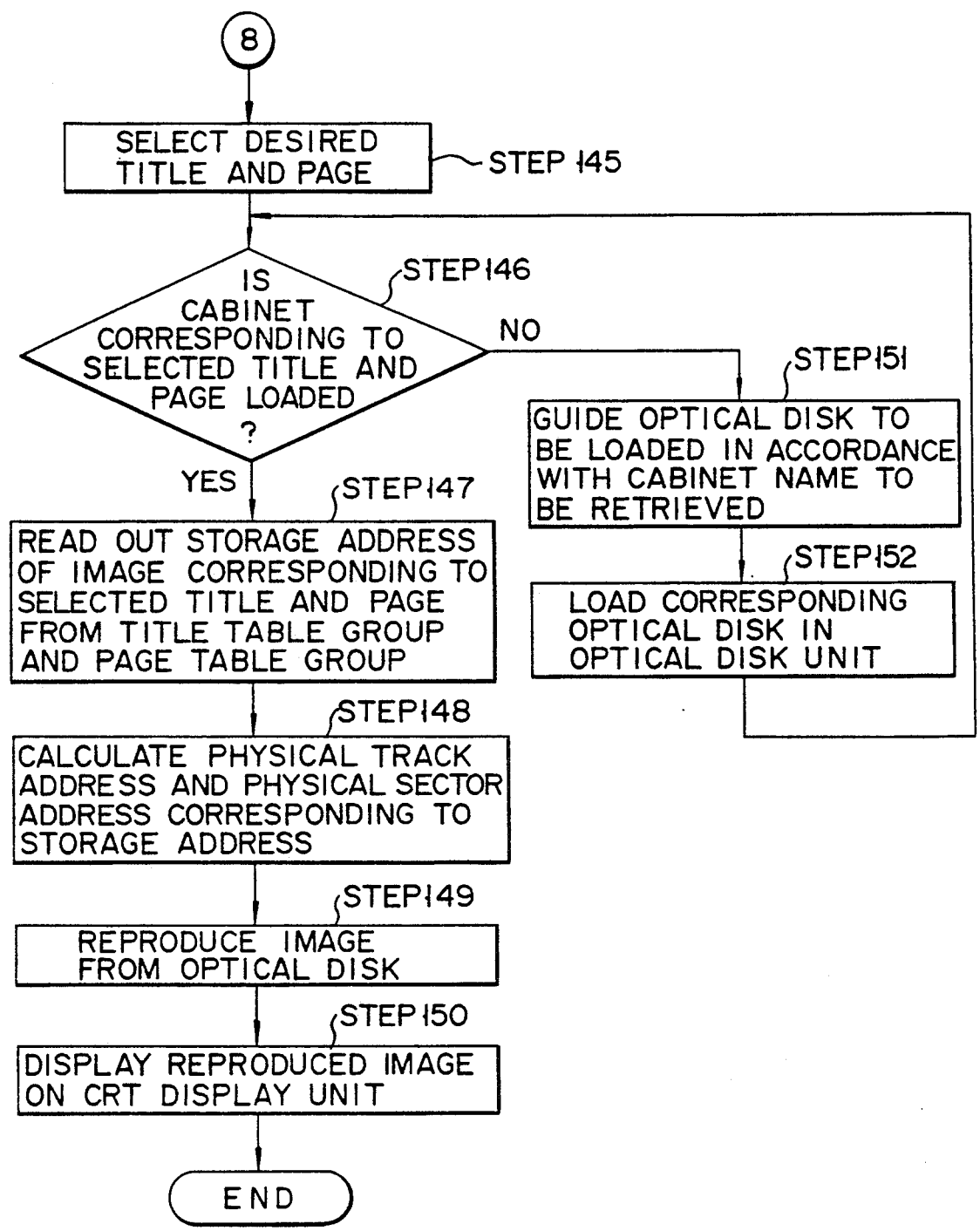
F I G. 16B

MULTIPLE USER ELECTRONIC FILING SYSTEM FOR IMAGE DATA USING A KEYED HIERARCHICAL FILE STRUCTURE

BACKGROUND OF THE INVENTION

1. Field of the Invention

The present invention relates to an electronic filing system and, more particularly, to an electronic filing system such as an image filing system for performing, for example, registration, retrieval, and deletion of an image.

2. Description of the Related Art

In recent years, an image filing apparatus has been put into practical use wherein images of a large amount of documents are read, the read images are stored in an optical disk, a selected one of the stored images is retrieved and read out, and the readout image is output in a visible state on an output unit such as a CRT (Cathode Ray Tube) display unit or a recording unit.

As network formation and systematisation have progressed, another type of image filing system has been put into practical use. This system includes a single central control apparatus for performing registration, deletion, and retrieval processing. The central control apparatus is connected, via a LAN (Local Area Network), to a plurality of terminal apparatuses. and Retrieval processing is performed while the terminal apparatuses communicate with the central control apparatus over the LAN.

However, in the network-type image filing system, when the central control apparatus is performing registration of an image, the terminal apparatuses cannot perform retrieval processing. Conversely, when a terminal apparatus is performing retrieval processing, the central control apparatus cannot perform registration of an image.

SUMMARY OF THE INVENTION

It is an object of the present invention to provide an electronic filing system wherein, when a first apparatus is performing registration of an image, a second apparatus can perform retrieval processing of an image which is registered by the first apparatus. Additionally, when the second apparatus is performing retrieval processing of an image which is registered by the first apparatus, the first apparatus can register an image. Thus, registration processing can be performed by the first apparatus and the retrieval processing can be performed independently by the second apparatus.

It is another object of the present invention to provide an electronic filing system wherein, when a first apparatus is performing registration, page addition, or delete processing of an image, a second apparatus can perform retrieval processing of an image which is registered by the first apparatus. Additionally when the second apparatus is performing retrieval processing of an image which is registered by the first apparatus, the first apparatus can perform registration, page addition, or delete processing of an image. Thus, registration processing, page addition processing, or delete processing can be performed by the first apparatus and retrieval processing can be performed independently by the second apparatus.

It is a further object of the present invention to provide an electronic filing system wherein the condition governing a change in the keys structure of a metabinder can be set, in advance, in an unpermitted mode, an automatic mode, or a selective mode, so that when the keys structure of the metabinder is to be changed, the keys structure can be inhibited from being changed, can be changed, or can be selectively changed in accordance with the previously set content. Thus, the metabinder can be used in a flexible manner.

According to the present invention, there is provided an electronic filing system wherein a single first apparatus and a plurality of second apparatuses are connected through lines, the first apparatus can register and retrieve images, and the second apparatuses can retrieve images from the first apparatus, wherein the first apparatus comprises:

first storing means, for storing a plurality of images in a first storing medium, at four hierarchical levels including cabinet, binder, document, and page, second storing means for storing a plurality of retrieval information items in a second storing medium, each of the retrieval information items including of a plurality of keys arranged to have a different, key structure specific to a corresponding binder, third storing means, for storing in the second storing medium the retrieval information items in units of binders subordinate to a metabinder having a plurality of subordinate binders having the same key structure, updating means for updating contents of a retrieval information items stored in the second storing medium each time an image is stored in the first storing medium, and corresponding to the binder in which the image is to be registered, first receiving means, for designating retrieval information corresponding to a desired image and supplied from one of the second apparatuses, reading means for reading out candidate retrieval information item corresponding to the designating retrieval information received by the first receiving means from the retrieval information items in units of binders stored in the second storing medium and corresponding to the metabinder, first transmitting means, for transmitting to the second apparatuses the candidate retrieval information items read out from the reading means, second receiving means, for receiving selected retrieval information supplied from one of the second apparatuses in response to transmission the candidate retrieval information items by the first transmitting means, retrieving means for retrieving from the first storing medium an image corresponding to the selected retrieval information received by the second receiving means, and second transmitting means, for transmitting to the one of second apparatuses the image retrieved by the retrieving means; and the second apparatuses each comprises:

designating means for designating the designating retrieval information for retrieving to a predetermined image, third transmitting means, for transmitting to the first apparatus the designating retrieval information designated by the designating means, third receiving means, for receiving the candidate retrieval information items supplied from the first apparatus in response to transmission of the designating retrieval information from the third transmitting means, selecting means for selecting said selected retrieval information of the candidate retrieval information items received by the third receiving means, fourth transmitting means, for transmitting to the first apparatus the selected retrieval information selected by the selecting means, fourth receiving means, for receiving the image supplied from the first apparatus in response to the selected retrieval information transmitted by the fourth transmitting means, and output means for outputting the image received by the fourth receiving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic block diagram showing an arrangement of an electronic filing system according to the present invention;

FIG. 3 is a diagram showing a document management system of the electronic filing system shown in FIG. 1;

FIGS. 4 and 11 are diagrams showing stored contents of a title management table shown in FIG. 2;

FIG. 5 is a diagram showing stored contents of a page management table shown in FIG. 2;

FIGS. 6 and 12 are diagrams showing stored contents of a title structure management table shown in FIG. 2;

FIGS. 7 and 10 are diagrams showing stored contents of a binder management table shown in FIG. 2;

FIG. 13 is a schematic block diagram showing an arrangement of a terminal apparatus shown in FIG. 1;

FIGS. 16A and 16B are flow charts illustrating a method of image retrieval processing of the host;

DETAILED DESCRIPTION OF THE PREFERRED EMBODIMENTS

Figure 2:
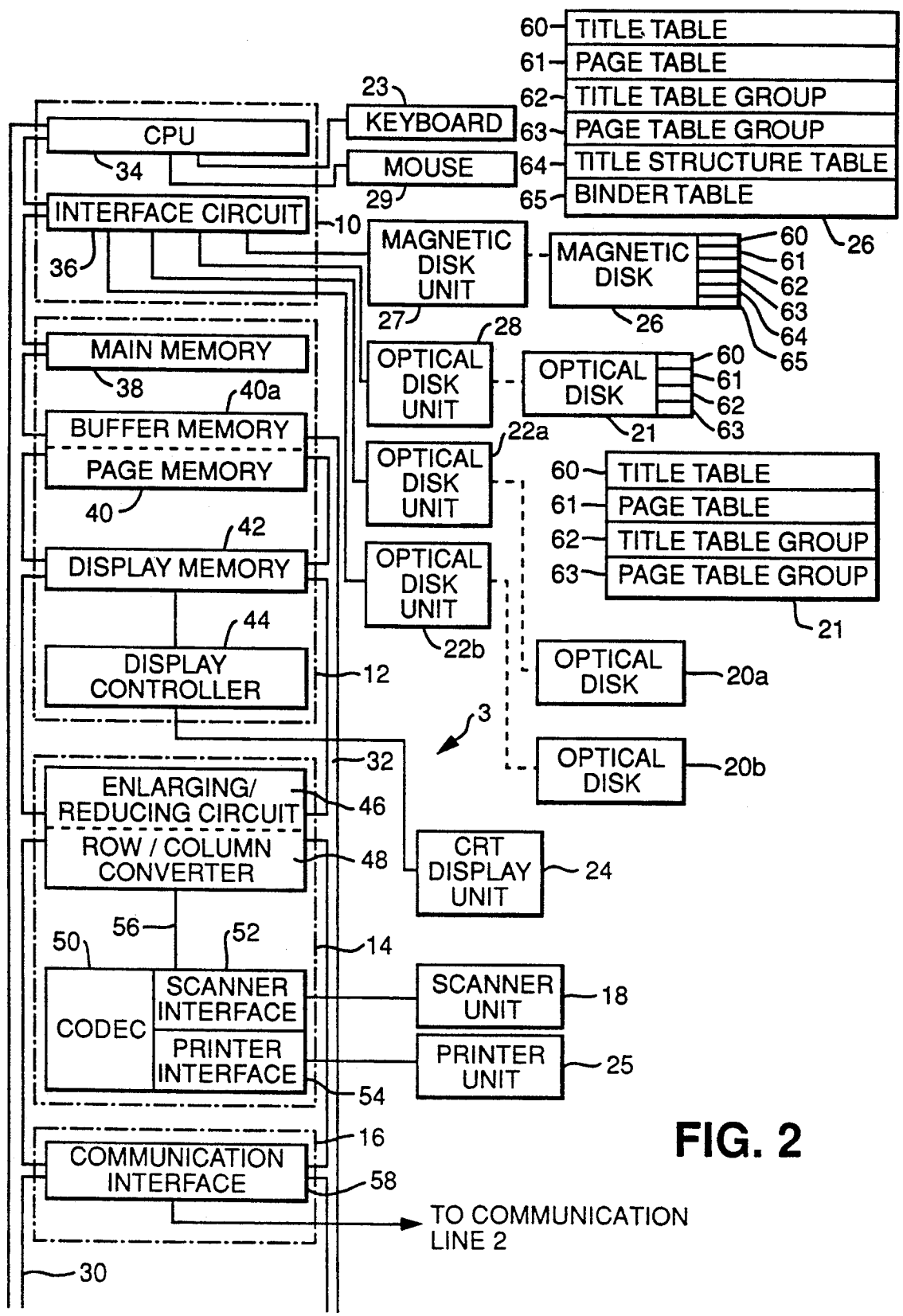
FIG. 2 is a schematic block diagram showing an arrangement of a central control apparatus shown in FIG. 1.

FIG. 1 shows in schematic form an embodiment of an electronic filing system according to the present invention.

Referring to FIG. 1, reference numerals 1a, 1b, ..., denote terminal apparatuses for retrieval; and 3, a central control apparatus. The terminal apparatuses 1a, 1b, etc., are connected to the central control apparatus 3 via a communication line 2.

As shown in FIG. 2, the central control apparatus 3 comprises a control module 10, a memory module 12, an image processing module 14, a communication control module 16, a scanner unit 18, optical disks 20a and 20b and optical disk units 22a and 22b, a keyboard 23, a CRT display unit (display means) 24, a printer unit 25, a magnetic disk 26 and a magnetic disk unit 27, an optical disk 21 and an optical disk unit 28, a mouse 29, a system bus 30, and an image bus 32.

The control module 10 is constituted by a CPU (Central Processing Unit) 34 for performing various control operations such as storage, retrieval, and edit processing of an image, and an interface circuit 36 for connecting the CPU 34 to the optical disk units 22a, 22b, and 28 and the magnetic disk unit 27. The keyboard 23 and the mouse 29 are connected to the CPU 34, which in turn is connected, via a communication line, to a CPU 134 (FIG. 13) of each the terminal apparatuses 1a, etc., (to be described later) so as to be able to accept a plurality of processing. For example, when the central control apparatus 3 is performing registration, retrieval, deletion, or the like, the CPU 34 can accept retrieval processing from the terminal apparatuses 1a, etc. However, the CPU 34 cannot accept retrieval processing from the terminal apparatuses with respect to a binder which is being subjected to registration, deletion, or the like by the central control apparatus 3.

The memory module 12 is constituted by a main memory 38 for storing, for example, various control programs for processing, such as for storage, retrieval, and editing of an image, as well as management information, a page memory 40 serving as an image memory and having a capacity equivalent to an image made up of several pages of A4-size originals, and a display memory 42 and a display controller 44 serving as a display interface. Situated in a region of the page memory 40 is a buffer memory area 40a. The page memory 40 temporarily stores an image to be stored in the optical disk 20a (20b) or one read out from the optical disk 20a (20b).

The display memory 42 temporarily stores image data to be displayed on a display window of the CRT display unit 24; for example, data obtained as a result of performing enlargement, reduction, rotation, insertion, or black/white reversal processing of image data supplied from the page memory 40 or from the buffer memory area 40a.

The image processing module 14 is constituted by an enlarging/reducing circuit 46 for enlarging and reducing an image, a row/column converter 48 for rotating an image, a compressing/expanding circuit (CODEC) 50 for performing coding processing for compressing an image (i.e., decreasing redundancy) and a decoding processing for expanding an image (i.e., reverting from decreased redundancy to the original redundancy), a scanner interface 52 for the scanner unit 18, a printer interface 54 for the printer unit 25, and an internal bus 56 for connecting together the enlarging/reducing circuit 46 and the row/column converter 48, the CODEC 50, the scanner interface 52, and the printer interface 54.

The CODEC 50 performs band compression or expansion, using a Modified Huffman (MH) scheme or a Modified Read (MR) scheme.

The communication control module 16 is constituted by a communication interface 58 such as a BCP (Bus Communication Processor) connected to a LAN. The communication control module 16 may include an FCP (Facsimile Communication Processor) or a UCP (Universal Communication Processor) connected to external equipment such as a personal computer.

The communication control module 16 is connected to communication control modules of the terminal apparatuses 1a, etc., via the communication line 2, so as to be able to transmit image information with respect to an inquiry retrieval code and to supply a received inquiry retrieval code to the main memory 38.

The system bus 30 is provided for supplying various control signals from the control module 10 to the memory module 12, the image processing module 14, and the communication control module 16. The image bus 32 is provided for supplying images from the memory module 12 to the image processing module 14 and the communication control module 16.

The scanner unit 18 can be, for example, a two-dimensional scanning unit for two-dimensionally scanning an original (document) by laser beam light to obtain an electrical signal corresponding to an image on the original.

The optical disk unit 22a (22b) stores in sequential order in the optical disk 20a (20b) the images read by the scanner unit 18, and retrieves from the optical disk 20a (20b) images corresponding to retrieval information designated by the keyboard 23 or the like. Both disk units are connected to an auto changer (not shown) for loading selected optical disks.

The keyboard 23 inputs specific retrieval information for an image to be stored in the optical disk 20a (20b) and various operation commands for, for example, storage, retrieval, and edit processing. The mouse 29 arbitrarily moves a cursor (not shown) displayed on a display window of the CRT display unit 24 in the horizontal and vertical directions. When the cursor is moved to a desired position, the operator then operates the mouse 29 so as to select or designate the display contents (various operation modes, area designation for image edit, an icon, or the like) being indicated by the cursor.

The CRT display unit (cathode ray tube display unit) 24 displays an image read by the scanner unit 18 and one retrieved from the optical disk 20a (20b). Icons or the like are displayed at upper, lower, and right ends of the display window of the CRT display unit 24.

The CRT display unit 24 is a multi-window type display unit capable of simultaneously displaying images by using one, two, or four windows. Each of the images displayed on the display windows can be independently subjected to edit processing such as enlargement, reduction, rotation, and scroll.

The printer unit 25 prints out (i.e., makes a hard copy of) an image read by the scanner unit 18, an image retrieved from the optical disk 20a (20b), or an image displayed on the CRT display unit 24.

The magnetic disk unit 27 stores various control programs in the magnetic disk 26 loaded in the magnetic disk unit 27. In addition, the magnetic disk unit 27 stores retrieval data consisting of, e.g., retrieval information input from the keyboard 23, a storage address on the optical disk 20a (20b) which stores an original image corresponding to the retrieval information, and an image size. The magnetic disk unit 27 also stores a title structure and binder management data (to be described later).

The optical disk unit 28 stores retrieval information, retrieval data, and binder management data similar to those stored in the magnetic disk 26 in the rewritable optical disk 21 loaded in the optical disk unit 28.

As shown in FIG. 3, the document management system of this embodiment has five hierarchical levels, consisting of metabinder, cabinet, binder (independent binder), document, and page, and the cabinet corresponds to one side of the optical disk 20a (20b). A maximum of eight binders can be defined in the cabinet, and a maximum of 30,000 documents can be stored in the binder. Each document has its title, and a structure of the document is defined in units of binders. The document is a basic unit of a file and can have notes (an explanation of the document) in addition to the title. The document is constituted by a maximum of 4,095 pages.

Each binder has a title management table (title table) 60 and a page management table (page table) 61. As shown in FIG. 4, the title management table 60 stores retrieval information (image name) constituted by a plurality of retrieval keys, for example, a position and a name, for each document number, i.e., a title number. The page management table 61 stores record numbers in units of pages of one document. As shown in FIG. 5, the page management table 61 stores title numbers, page numbers, record numbers, storage addresses (storage start positions) of original images in the optical disk 20a (20b) in units of record numbers, and document sizes (image sizes). The storage address is a logic address for calculating a physical track address and a physical sector address upon accessing.

The metabinder has a title management table group (title table group) 62 and a page management table group (page table group) 63 having the same contents as those stored in the tables 60, . . . , and 61, . . . , of the plurality of subordinate binders of the metabinder. The tables 60, . . . , 61, . . . , the table groups 62, . . . , and 63, . . . , are stored in the magnetic disk 26 or the optical disk 21.

The magnetic disk 26 has a title structure management table 64 for managing structures of titles used in the title management tables 60, . . . , and a binder management table 65 for managing a structure of each binder/metabinder.

As shown in FIG. 6, the title structure management table 64 is constituted by binder/metabinder numbers, key numbers, key attributes, key lengths each indicating the number of digits of a key, and key names. Numbers "0", "1", and "2" of the key attribute represent a numeral, a character, and a kanji character (i.e., Chinese character used in Japanese writing), respectively.

As shown in FIG. 7, the binder management table 65 is constituted by a binder/metabinder number area (a), a binder/metabinder type area (b), a binder name/metabinder name area (c), a title structure change attribute area (c), a title table presence/absence and location area (e), a page table presence/absence and location area (f), an up-data attribute area (g), an automatic delete attribute area (h), an intratitle key number area (i), a binder definition date area (j) and a title storage arrangement area (k).

Numbers are serially assigned to the binder/metabinder number area (a) regardless of whether the area indicates a binder or a metabinder. The binder/metabinder type area (b) stores a type indicating a binder or a metabinder. "0", "−1", and "1" or more of the binder/metabinder type area (b) represent a metabinder, an independent binder, and a binder and the number of a metabinder to which the binder belongs, respectively. The title structure change attribute area (d) stores title structure change attributes each indicating whether change processing of title structures (keys structures) is permitted and, if the change processing is permitted, indicating whether the change processing is to be automatically or selectively performed. "0", "1", and "2" of the title structure change attribute area (d) represent "unpermitted", "permitted"/automatic change processing (automatic mode), and "permitted"/selective change processing (selective mode).

In the automatic mode, title structures of all subordinate binders of a metabinder are automatically changed as a title structure of the metabinder is changed. In the selective mode, the title structure of each subordinate binder of a metabinder is selectively changed into the same title structure of the metabinder when the title structure of the metabinder is changed.

The title table presence/absence and location area (e) stores data indicating the presence/absence of the title table group 62 and the title table 60 and their location. "0", "1", and "2" of the title table presence/absence and location area (e) represent that the title table group 62 and the title table 60 are absent, that the title table group 62 and the title table 60 are present in the magnetic disk 26, and that the title table group 62 and the title table 60 are present in the optical disk 21, respectively. The page table presence/absence and location area (f) stores data indicating the presence/absence of the page table group 63 and the page table 61 and their location. "0", "1", and "2" of the page table presence/absence and location area (f) represent that the page table group 63 and the page table 61 are absent, that the page table group 63 and the page table 61 are present in the magnetic disk 26, and that the page table group 63 and the page table 61 are present in the optical disk 21.

The up-data attribute area (g) stores an up-data attribute for indicating a timing at which update information of the subordinate binders are set in the title table group 62 or the page table group 63 of a corresponding metabinder. "0", "1", and "2" of the up-data attribute area (g) represent "immediate", "automatic", and "selective", respectively.

In the immediate mode, immediately after the title table 60 or the page table 61 of the subordinate binders are updated, the title table group 62 or the page table group 63 of a corresponding metabinder is updated. In the automatic mode, in accordance with updated contents of the subordinate binders, the title table group 62 or the page table group 63 of a corresponding metabinder is automatically updated at a preset arbitrary timing such as an end timing of a task. In the selective mode, in accordance with updated contents of a binder, the title table group 62 or the page table group 63 of a corresponding metabinder is selectively updated by an operator.

The automatic delete attribute area (h) stores an automatic delete attribute for indicating whether the title table group 62 and the page table group 63 of the metabinder and the title table 60 and the page table 61 of the binder can be deleted when the magnetic disk 26 is full.

"0", "1", and "2" of the automatic delete attribute area h represent that automatic delete is permitted, that automatic delete is inhibited, and that automatic delete is permitted and executed.

The intratitle key number area (i) stores a key number defined by a title structure. The binder definition date area (j) stores a date on which the binder are defined. The title storage arrangement area (k) stores data indicating whether titles are to be stored in a registration order (sequential) or an index sequential access method (ISAM) in which titles are stored in the order of the kana syllabary (i.e., Japanese alphabet) is to be adopted. "0" and "1" of the title storage arrangement area (k) represent "sequential" and "ISAM", respectively.

Definition of a title structure will be described below with reference to the stored contents of the title structure management table title structure table) 64 shown in FIG. 5. That is, a key 1 having key number "1", a key attribute "numeral", and a key length of 10 digits, and a key 2 having key number "2", a key attribute "character", and a key length of 15 digits are set for a metabinder "2". A key 1 having key number "1", a key attribute "numeral", and a key length of 10 digits, and a key 2 having key number "2", a key attribute "character", and a key length of 15 digits are set for binders "11" and "12". In this case, the subordinate binders "11" and "12" belong to the metabinder "2" and have the same title structure.

Figure 8A:
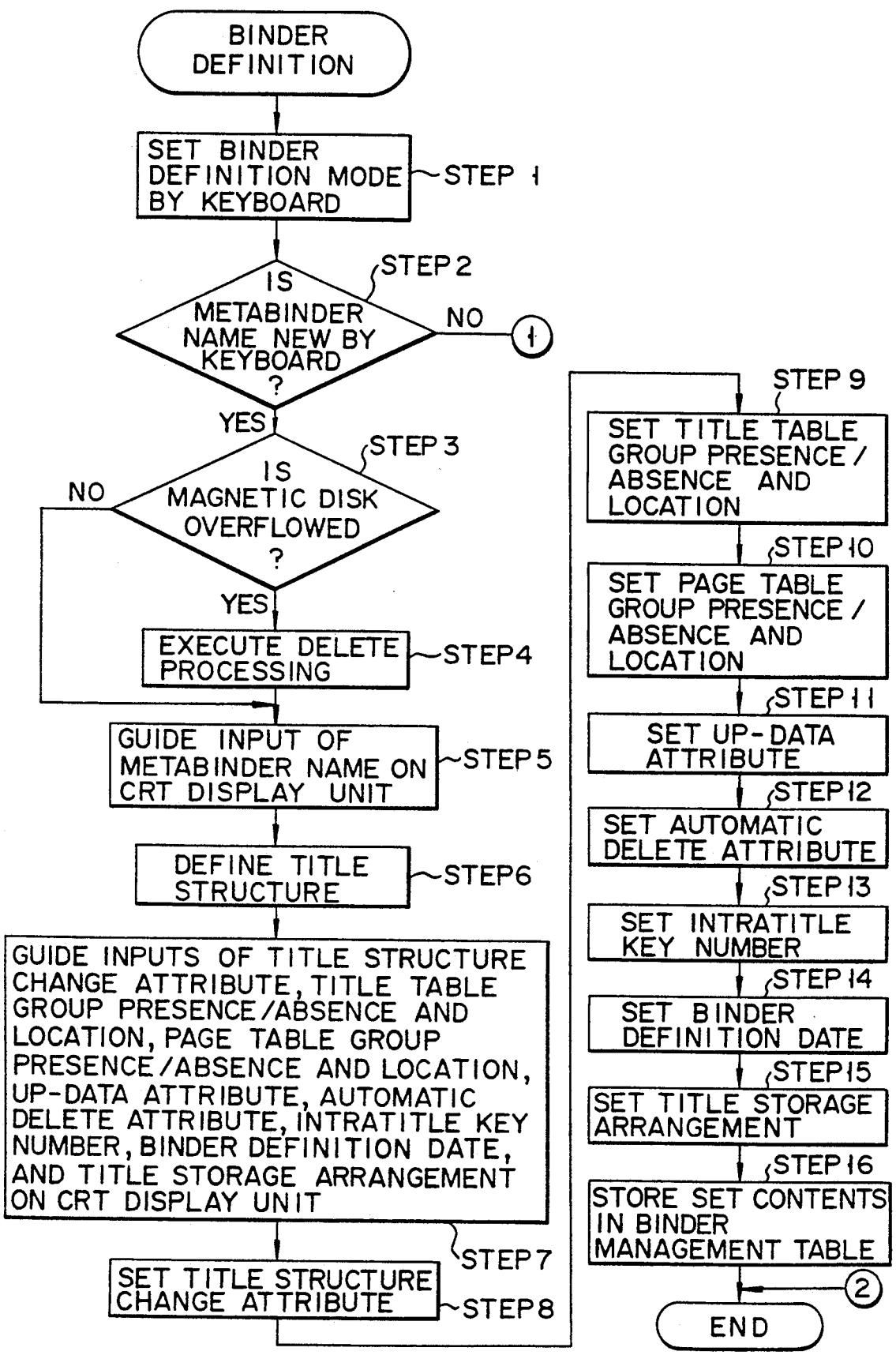
FIGS. 8A and 8B are flow charts illustrating a method of definition of a title structure shown in FIG. 2.
Figure 8B:
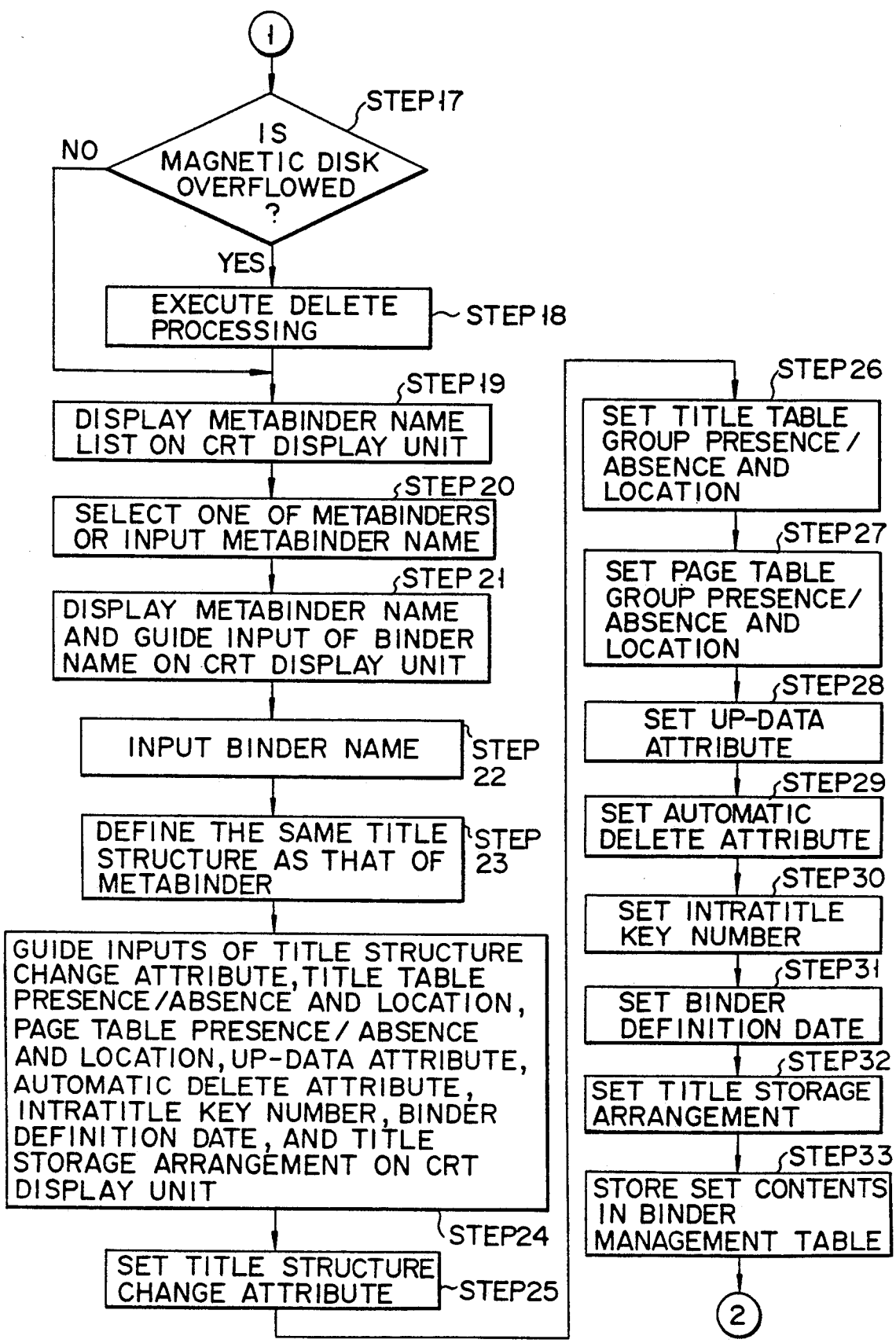

Definition of the binder in the above arrangement will be described below with reference to flow charts shown in FIGS. 8A and 8B. An operator sets a binder definition mode (STEP 1) and designates whether a metabinder name is new (STEP 2) by using the keyboard 23. If the metabinder name is new, the CPU 34 checks whether the magnetic disk 26 is full (overflows) (STEP 3). If the magnetic disk 26 is not full in STEP 3, the flow advances to STEP 5. If the magnetic disk 26 is full, the title table group 62 or the page table group 63 of an old metabinder for which delete processing is permitted is deleted (STEP 4).

That is, if the type stored in the area (c) of the binder management table (binder table) 65 indicates the metabinder and the delete attribute stored in its area (h) is "0", the CPU 34 selects the metabinder having the oldest binder formation date stored in the area (j), and the delete attribute in the area (h) corresponding to the selected metabinder is changed to "2" indicating that delete processing is performed. As a result, the title table group 62 or the page table group 63 corresponding to the metabinder is deleted, and the area from which the tables are deleted is used as an area for the title table group 62 or the page table group 62 corresponding to a new metabinder.

Subsequently, the CPU 34 causes the CRT display unit 24 to guide an input of a metabinder name (STEP 5). In accordance with this guidance, the operator inputs a metabinder name from the keyboard 23 to define a title structure (STEP 6). For example, as a title structure, a key attribute "0", a key length "10", and a key name "key 1" are set for a key number "1", and a key attribute "1", a key length "15", and a key name "key 2" are set for a key number "2". The CPU 34 stores the set title structure in the title structure management table 64. In this case, since this metabinder is the second one as a binder, a metabinder number "2" is assigned to the metabinder.

The CPU 34 causes the CRT display unit 24 to guide inputs of a title structure change attribute, a title table group presence/absence and location, a page table group presence/absence and location, an up-data attribute, an automatic delete attribute, an intratitle key number, a binder definition date, and a title storage arrangement (STEP 7). In accordance with this guidance, the operator sets, by using the keyboard 23, the title structure change attribute to "unpermitted" (0) (STEP 8), the title table presence/absence and location to the "magnetic disk 26" (1) (STEP 9), the page table presence/absence and location to the "magnetic disk 26" (1) (STEP 10), the up-data attribute to "automatic" (1) (STEP 11), the automatic delete attribute to "permitted" (0) (STEP 12), the intratitle key number to "2" (STEP 13), the binder definition date, for example, to "89. 1. 1" (STEP 14), and the title storage arrangement to "sequential" (1) (STEP 15).

As shown in FIG. 7, the CPU 34 stores, for the binder number "2" in the binder management table 65, "0" as the binder/metabinder type, the binder name/metabinder name, "0" as the title structure change attribute, "1" as the title table presence/absence and location, "1" as the page table presence/absence and location, "1" as the up-data attribute, "0" as the automatic delete attribute, "2" as the intratitle key number, "89. 1. 1" as the binder definition date, and "1" as the title storage arrangement (STEP 16).

If it is designated in STEP 2 that the metabinder name is not new, the CPU 34 checks whether the magnetic disk 26 is full (overflows) (STEP 17). If the magnetic disk 26 is not full, the flow advances to STEP 19. If the magnetic disk 26 is full, delete processing is performed for the title table 60 and the page table 61 of an old binder for which delete processing is permitted (STEP 18). That is, if the type stored in the area (c) of the binder management table 65 indicates a "binder" and the delete attribute stored in its are (h) is "0" (automatic), the CPU 34 selects a binder having the oldest binder formation date in the area (j), and the delete attribute stored in the are (h) corresponding to the selected binder is changed to "2" indicating that the delete processing is performed. As a result, the title table 60 and the page table 61 corresponding to the binder are deleted, and the area from which the tables are deleted is used as an area for the title table 60 and the page table 61 corresponding to the new binder.

Subsequently, the CPU 34 retrieves the binder management table 65, extracts metabinders having "0" as the binder/metabinder type, and displays a metabinder name list on the CRT display unit 24 (STEP 19). The operator selects one of the displayed metabinders or inputs a metabinder name from the keyboard 23 (STEP 20). The CPU 34 causes the CRT display unit 24 to display the metabinder name and guide an input of a binder name (STEP 21). In accordance with this guidance, the operator inputs a binder name by the keyboard 23 (STEP 22).

The CPU 34 defines the same title structure as that of the metabinder (STEP 23). If the binder belongs to the metabinder "2", for example, a key attribute "0", a key length "10", and a key name "key 1" are set for a key number "1", and a key attribute "1", a key length "15", and a key name "key 2" are set for a key number "2", as a title structure. The CPU 34 stores the set title structure in the title structure management table 64. In this case, since this binder is the 11th one as a binder, a binder number "11" is assigned to the binder.

Subsequently, the CPU 34 causes the CRT display unit 24 to guide inputs of the title structure change attribute, the title table presence/absence and location, the page table presence/absence and location, the up-data attribute, the automatic delete attribute, the intratitle key number, the binder definition date, and the title storage arrangement (STEP 24). In accordance with this guidance, the operator sets, by the keyboard 23, the title structure change attribute to "unpermitted" (0) (STEP 25), the title table presence/absence and location to the "magnetic disk 26" (1) (STEP 26), the page table presence/absence and location to "magnetic disk 26" (1) (STEP 27), the up-data attribute to "automatic" (1) (STEP 28), the automatic delete attribute to "permitted" (0) (STEP 29), the intratitle key number to "2" (STEP 30), the binder definition date to "89. 1. 1" (STEP 31), and the title storage arrangement to "ISAM" (0) (STEP 32). As shown in FIG. 7, the CPU 34 stores, for the binder number "11" of the binder management table 65, "2" as the binder/metabinder type, the binder name/metabinder name, "0" as the title structure change attribute, "1" as the title table presence/absence and location, "1" as the page table presence/absence and location, "1" as the updata attribute, "0" as the automatic delete attribute, "2" as the intratitle key number, "89. 1. 1" as the binder definition date, and "0" as the title storage arrangement (STEP 33).

Figure 9A:
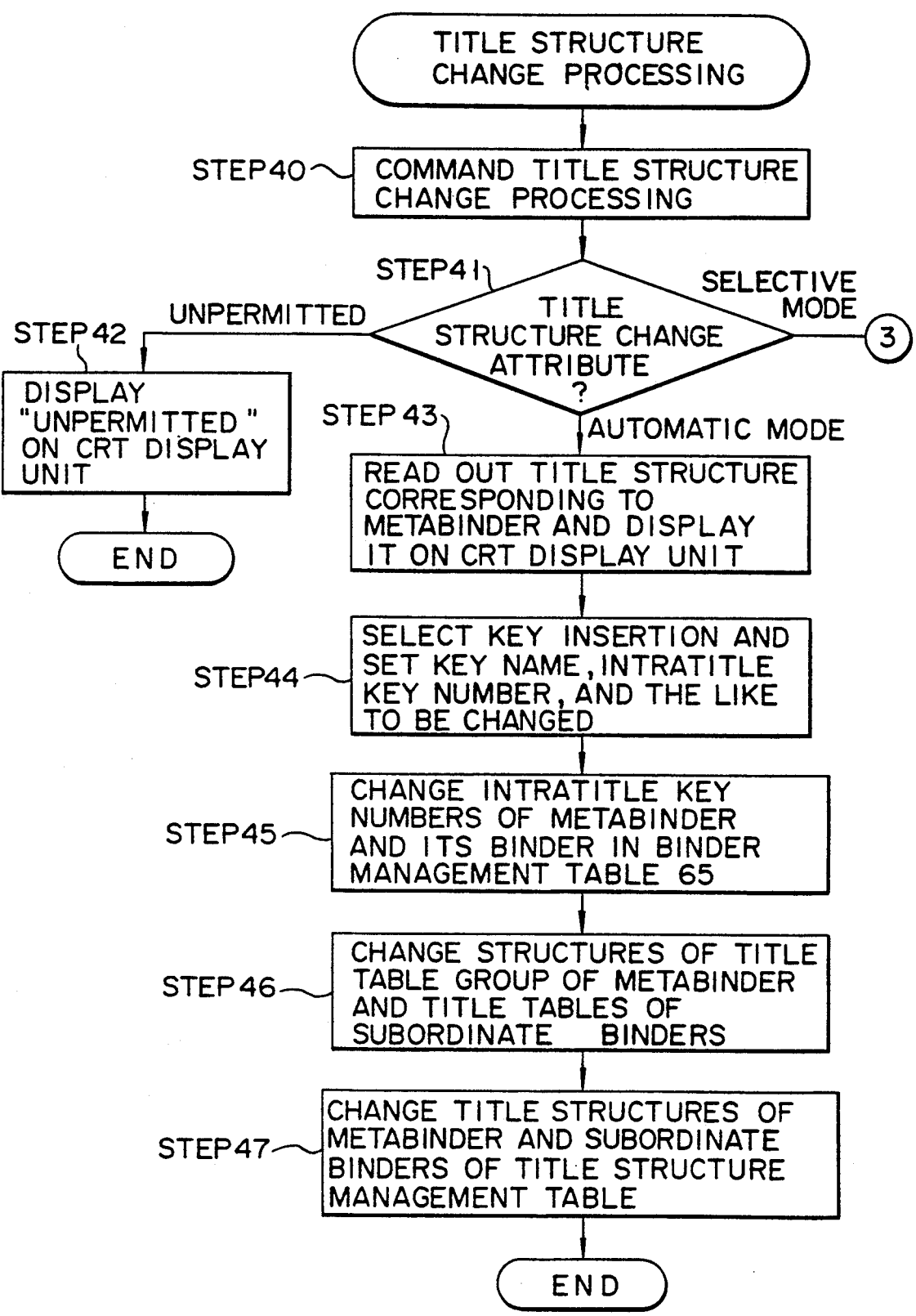
FIGS. 9A and 9B are flow charts illustrating a method of title structure change processing.
Figure 9B:
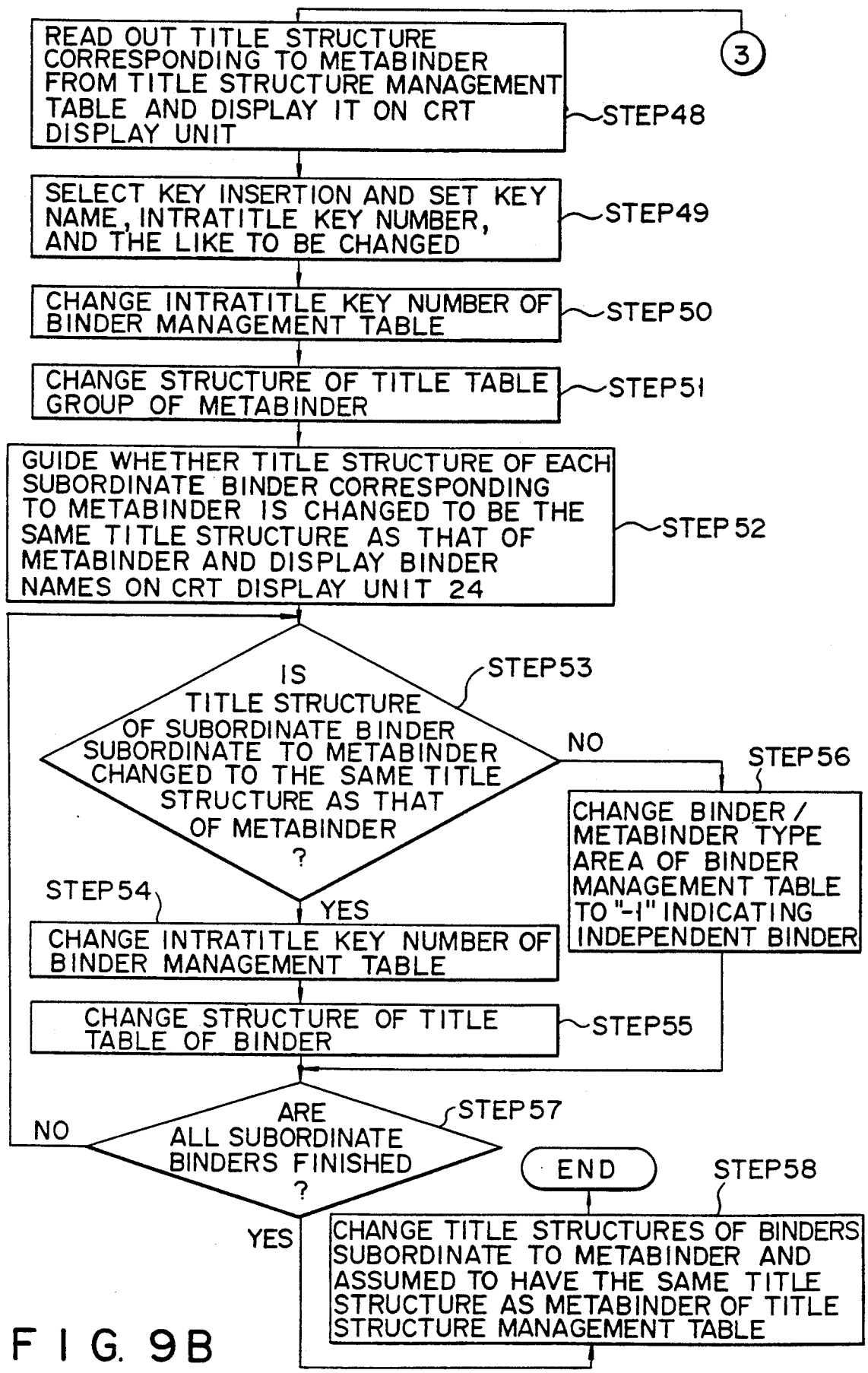

Title structure change processing performed in this state will be described below with reference to flow charts shown in FIGS. 9A and 9B. An operator designates change processing for a title structure of a metabinder by using the keyboard 23 (STEP 40). The CPU 34 checks the content in the title structure change attribute area d of the binder management table 65 corresponding to a currently corresponding metabinder (STEP 41). If the content is "0", the CPU 34 determines inhibition of the request (unpermitted) and informs this determination to the operator on the CRT display unit 24 (STEP 42).

If the content is "1" in STEP 41, the CPU 34 determines that title structure change processing is to be performed in the automatic mode. If the content is "2" in STEP 41, the CPU 34 determines that the title structure change processing is to be performed in the selective mode.

If the CPU 34 determines in STEP 41 that the title structure change processing is to be performed in the automatic mode, it reads out a title structure corresponding to the metabinder from the title structure management table 64 and displays the readout title structure on the CRT display unit 24 (STEP 43). In accordance with this display, the operator selects "key insertion" on the keyboard 23 to set, e.g., a key name and an intratitle key number to be changed (STEP 44). The CPU 34 changes the contents stored in the intratitle key number area (i) of the corresponding metabinder and subordinate binders of the binder management table 65 to the set key number (STEP 45). Subsequently, the CPU 34 checks the presence/absence and the location of the title table group 62 and the title tables 60, . . . , in accordance with the contents stored in the title table presence/absence and location area (e) of the metabinder and subordinate binders of the binder management table 65, and changes the structure of the title table group 62 and the title tables 60 stored in this location, i.e., the magnetic disk 26 or the optical disk 21 to the designated structure (STEP 46). In addition, the CPU 34 changes the title structure of the corresponding metabinder and subordinate binders of the title structure management table 64 (STEP 47).

For example, if the intratitle key number of the metabinder "2" is changed from "2" to "3", the intratitle key number of the corresponding metabinder "2" of the binder management table 65 is changed from "2" to "3", and the intratitle key number of each of the subordinate binders "11" and "12" of the metabinder "2" is changed from "2" to "3", as shown in FIG. 10. Subsequently, the CPU 34 changes the structure of the title table group 62 and the title tables 60, . . . , stored in the magnetic disk 26 or the optical disk 21 to a structure additionally having an area of a key "3" as shown in FIG. 11. In addition, as shown in FIG. 12, the CPU 34 additionally stores the title structure of the key "3" of the corresponding metabinder "2" of the title structure management table 64 and that of the key "3" of each of the subordinate binders "11" and "12" of the metabinder "2".

If the CPU 34 determines in STEP 41 that the title structure change processing is to be performed in the selective mode, it reads out a title structure corresponding to the metabinder from the title structure management table 64 and displays the readout title structure on the CRT display unit 24 (STEP 48). In accordance with this display, the operator selects "key insertion" on the keyboard 23 to set, e.g., a key name and an intratitle key number to be changed (STEP 49). The CPU 34 changes the content stored in the intratitle key number area (i) of the corresponding metabinder in the binder management table 65 to the set key number (STEP 50). Subsequently, the CPU 34 checks the presence/absence and the location of the title table group 62 in accordance with the content stored in the title table presence/absence and location area (e) of the metabinder in the binder management table 65, and changes the structure of the title table group 62 stored in this location, i.e., the magnetic disk 26 or the optical disk 21 to the designated structure (STEP 51).

The CPU 34 causes the CRT display unit 24 to guide whether a title structure of each of binders subordinate to the metabinder is changed to the same title structure as that of the metabinder and to display binder names (STEP 52). If the same title structure is designated in accordance with this guidance (STEP 53), the CPU 34 changes the contents stored in the intratitle key number area (i) of the corresponding binders in the binder management table 65 to the set key number (STEP 54). Subsequently, the CPU 34 checks the presence/absence and the location of the title table 60 in accordance with the content in the title table presence/absence and location area (e) of the binder in the binder management table 65, and changes the title table 60 stored in this location, i.e., the magnetic disk 26 or the optical disk 21 to the designated structure (STEP 55).

If the same title structure is not designated in accordance with the guidance in STEP 52 (STEP 53), the CPU 34 changes the content in the binder/metabinder type area (b) of the binder management table 65 to "−1" which indicates an independent binder (STEP 56). As a result, this binder becomes an independent binder which no subordinate to the metabinder.

If the processing for subordinate all binders belonging to the metabinder is finished (STEP 57), the CPU 34 changes the title structure of the binders determined to have the same title structure as that of the subordinate metabinder of the title structure management table 64 (STEP 58).

The terminal apparatuses 1a, 1b, . . . , are used to input a retrieval request and arranged as shown in FIG. 13.

That is, referring to FIG. 13, each of the terminal apparatuses 1a, 1b, etc., is constituted by a control module 110, a memory module 112, an image processing module 114, a communication control module 116, a keyboard 123, a CRT display unit 124, a printer unit 125, a mouse 129, a system bus 130, and an image bus 132.

The control module 110 comprises a CPU 134 for performing various control operations for, e.g., image retrieval and edit processing. The keyboard 123 and the mouse 129 are connected to the CPU 134. The CPU 134 is directly connected to the CPU 34 of the center 3 to perform the same processing as in the center 3 in the terminal apparatus 1a (1b, . . .).

The memory module 112 is constituted by a main memory 138 for storing various control programs for, e.g., retrieval and edit of an image, management information, and the like, a page memory 140 as an image memory having a storage capacity corresponding to images of several pages of A4-size originals, and a display memory 142 and a display controller 144 as a display interface. A buffer memory area 140a is allocated in a portion of the page memory 140. The page memory 140 temporarily stores an image supplied from, e.g., the center 3.

The display memory 142 temporarily stores an image to be displayed on the CRT display unit 124. The display memory 142 stores an image to be actually displayed on a display window of the CRT display unit 124, e.g., an image obtained by performing enlargement, reduction, rotation, insertion, or black/white reversal processing for an image from, e.g., the page memory 140 or the buffer memory area 140a.

The image processing module 114 is constituted by an enlarging/reducing circuit 146 for enlarging and reducing an image, a row/column converter 148 for rotating an image, a compressing/expanding circuit 150 for performing coding processing for compressing an image (i.e., decreasing a redundancy) and a decoding processing for expanding an image (i.e., returning a decreased redundancy to the original redundancy), a printer interface 154 for the printer unit 125, and an internal bus 156 for connecting the enlarging/reducing circuit 146 and the row/column converter 148, the compressing/expanding circuit 150, a scanner interface 152, and the printer interface 154.

The compressing/expanding circuit 150 performs band compression or expansion by using an MH (Modified Huffman) scheme or an MR (Modified Read) scheme.

The communication control module 116 is constituted by a communication interface 158 such as a BCP (Bus Communication Processor) connected to a LAN. The communication control module 116 may include an FCP (Facsimile Communication Processor) or a UCP (Universal Communication Processor) connected to external equipment such as a personal computer.

The communication control module 116 is connected to the communication control module 16 of the center 3 through the communication line 2 to transmit an inquiry retrieval code and supply an image corresponding to a received inquiry retrieval code to the display memory 142.

The system bus 130 is provided for control signals of various types of units and connects the control module 110 to the memory module 112, the image processing module 114, and the communication control module 116. The image bus 132 is provided for an image and connects the memory module 112 to the image processing module 114 and the communication control module 116.

The keyboard 123 inputs various operation commands for processing such as retrieval and edit processing. The mouse 129 arbitrarily moves a cursor (not shown) displayed on a display window of the CRT display unit 124 in vertical and horizontal directions. When the cursor moves to a desired position, an operator operates the mouse 129 to select or designate display contents (various operation modes, area designation for image edit, an icon, or the like) pointed by the cursor.

The CRT display unit 124 displays an image retrieved by the center 3. Icons or the like are displayed at upper, lower, and right ends of the display window of the CRT display unit 124.

The CRT display unit 124 is a multi-window type display unit capable of simultaneously displaying images by using one, two, or four windows. Each of the images displayed on the display windows can be independently subjected to edit processing, e.g., enlargement, reduction, rotation, and scroll.

The printer unit 125 prints out (i.e., forms a hard copy of) an image displayed on the CRT display unit 124.

Figure 14A:
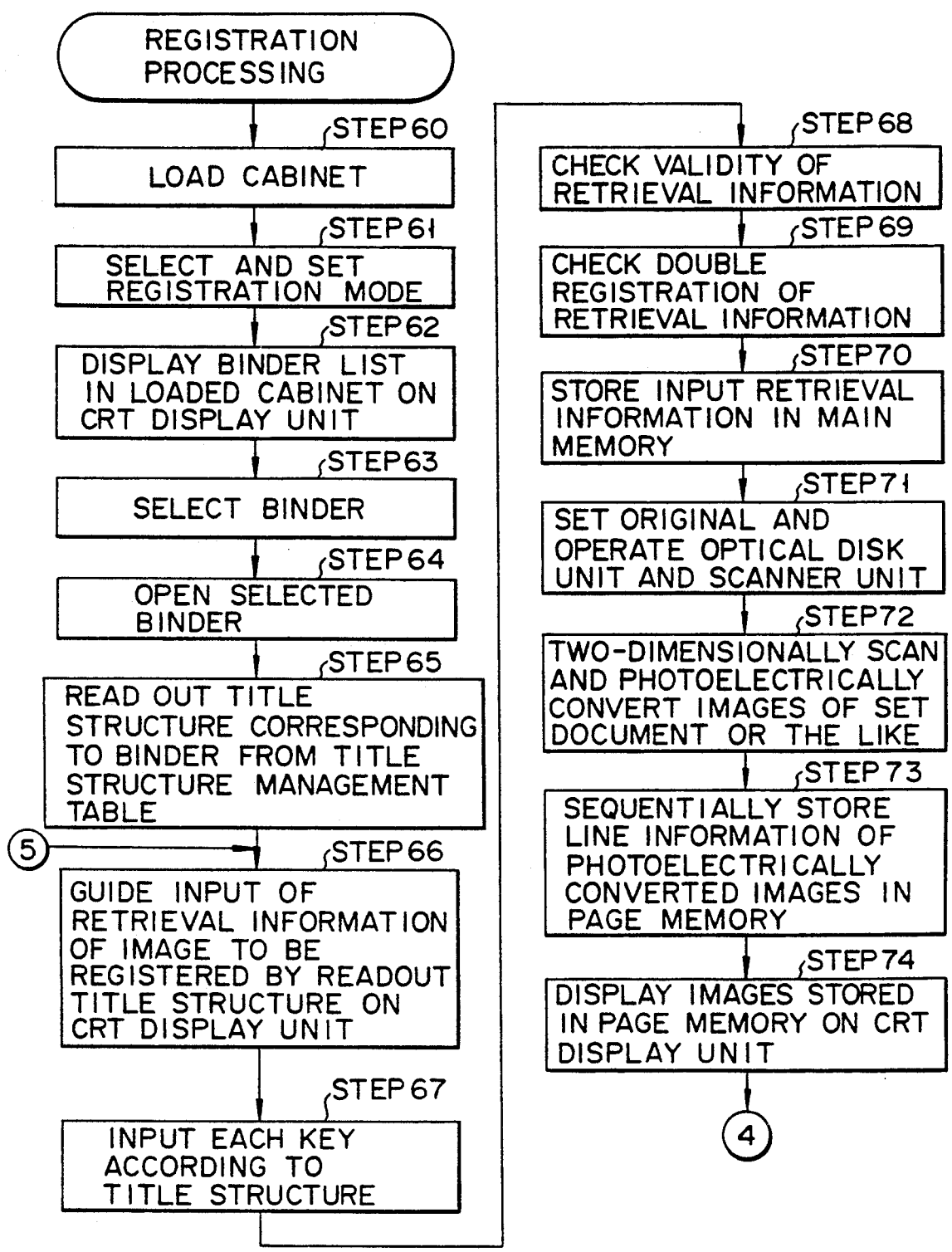
FIGS. 14A, 14B, and 14C are flow charts illustrating a method of image registration processing of a central control apparatus.
Figure 14B:
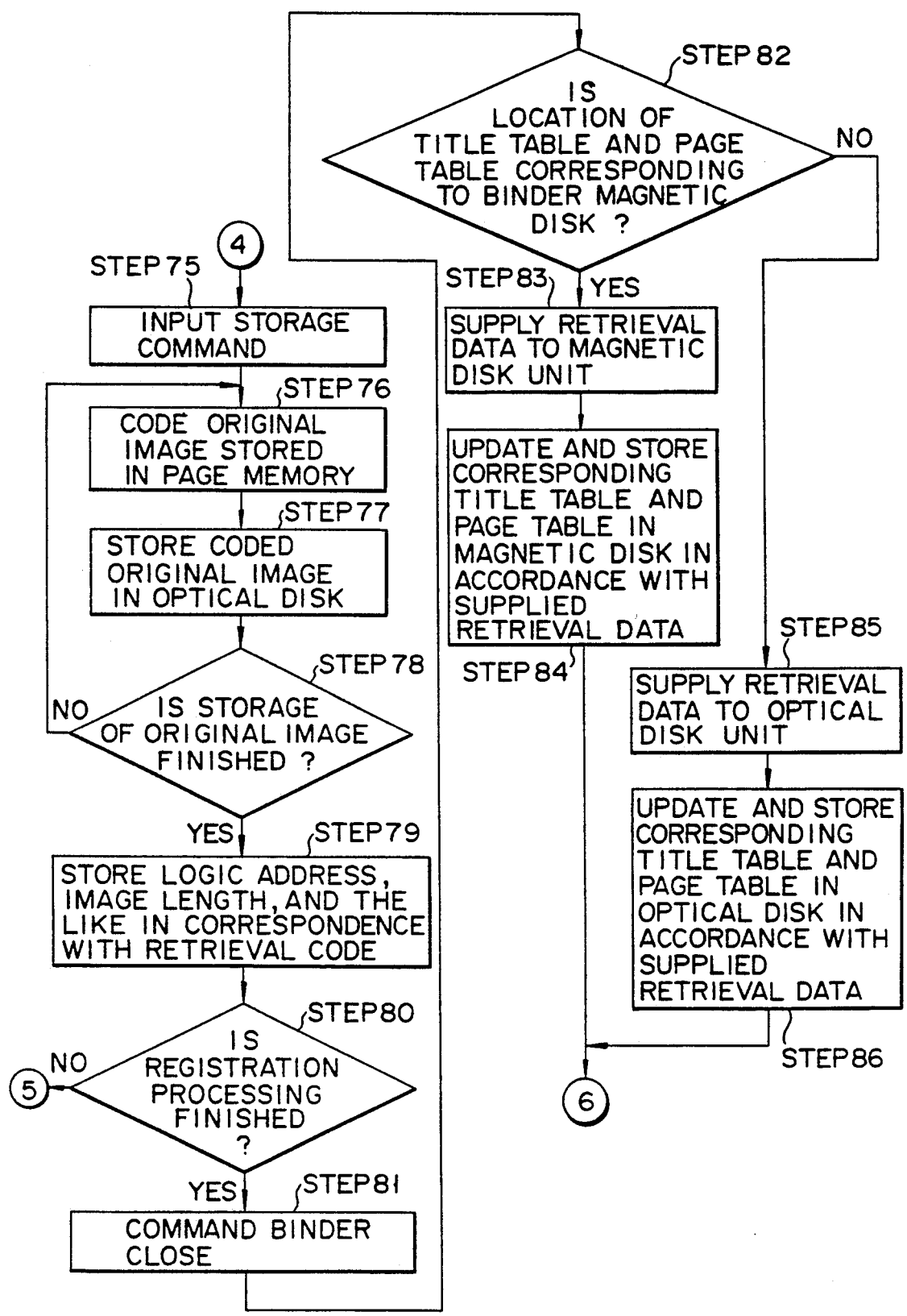
Figure 14C:
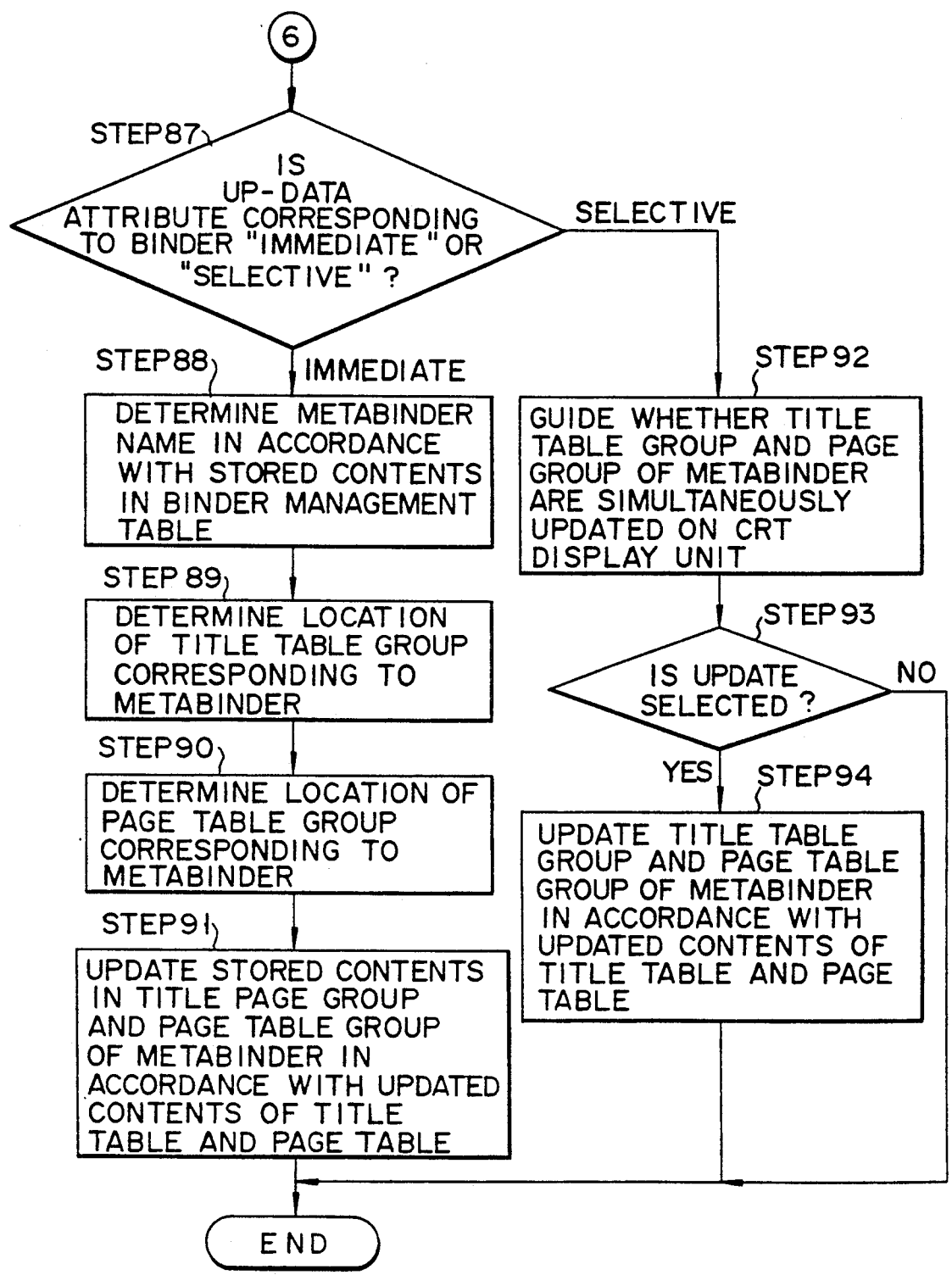

Operations of image storage (registration) and retrieval processing performed by the central control apparatus 3 will be described below. The image registration processing will be described first with reference to flow charts shown in FIGS. 14A, 14B, and 14C.

For example, while a menu screen is displayed on the CRT display unit 24, an operator loads a predetermined optical disk 20a (20b), i.e., a cabinet (STEP 60) and selects the registration mode by the keyboard 23 (STEP 61). The CPU 34 displays a binder list in the loaded cabinet on the CRT display unit 24 to guide selection of a binder (STEP 62). When the operator selects a binder by the keyboard 23 in accordance with this guidance (STEP 63), the CPU 34 opens the selected binder (STEP 64).

That is, the CPU 34 determines the location of the title table 60 in accordance with the title table presence/absence and location stored in the area (e) of the binder management table 65 corresponding to the binder, determines the location of the page table 61 in accordance with the page table presence/absence and location stored in the area (f) of the table 65, and enables read/write operations for the title and page tables 60 and 61. If data stored in the area (e) is "1", the CPU 34 determines that the location is the magnetic disk 26. If the data is "2", the CPU 34 determines the location is the optical disk 21.

Subsequently, the CPU 34 reads out the title structure corresponding to the binder from the title structure management table 64 (STEP 65) and causes the CRT display unit 24 to guide an input of retrieval information of an image to be registered by the readout title structure (STEP 66). In accordance with this guidance, the operator inputs each retrieval key on the keyboard 23 in accordance with the title structure (STEP 67). The CPU 34 checks validity of the input retrieval information in accordance with a format defined in advance (STEP 68). In addition, the CPU 34 compares the input retrieval information with retrieval information already registered in the optical disk 20a (20b) in accordance with the title table 60 and the page table 61, thereby checking double registration (STEP 69). In accordance with these check results, the input retrieval information is stored in the main memory 38 (STEP 70).

Thereafter, an original is set on the scanner unit 18, and the CPU 34 operates the optical disk unit 22a (22b) and the scanner unit 18 (STEP 71). The scanner unit 18 two-dimensionally scans and photoelectrically converts an image of the set document or the like (STEP 72). Line information of the photoelectrically converted image are sequentially stored in the page memory 40 (STEP 73). The image stored in the page memory 40 is enlarged or reduced by the enlarging/reducing circuit 46 in accordance with the display size of the CRT display unit 24, stored in the display memory 42, and displayed on the CRT display unit 24 (STEP 74). In this case, a resolution of the image is changed in accordance with a resolution of the CRT display unit 24 by using a VRAM (Video Random Access Memory) (not shown) or the like and is stored in the display memory 42.

The operator checks a skew, a density, a resolution, and the like of the image displayed on the CRT display unit 24. If quality of the displayed image is satisfactory, he or she inputs a storage command from the keyboard 23 (STEP 75). The CPU 34 causes the compressing/expanding circuit 50 to perform band compression for the original image stored in the page memory 40 in accordance with a known MR (Modified Read) scheme, thereby coding the original image (STEP 76). The coded original image is supplied to the optical disk unit 22a (22b) and stored in the optical disk 20a (20b) (STEP 77).

When storage of the original image into the optical disk 20a (20b) is finished (STEP 78), the CPU 34 stores a logic address determined from a physical track address and a physical sector address in which the original image is stored, an image length represented by a block length, and the like in the main memory 38 in correspondence with a retrieval code (retrieval information) (STEP 79).

Other images are also stored in the optical disk 20a (20b), and retrieval codes are stored in the main memory 38.

When the registration processing is finished (STEP 80), the operator commands binder close by the keyboard 23 (STEP 81). The CPU 34 checks the location of the title table 60 and the page table 61 stored in the areas (e) and (f) in the binder management table 65 corresponding to the binder (STEP 82). If the location is determined to be the magnetic disk 26, the CPU 34 supplies the retrieval data stored in the main memory 38 to the magnetic disk unit 27 (STEP 83). The magnetic disk unit 27 updates and stores the supplied retrieval data in corresponding title and page tables 60 and 61 in the magnetic disk 26 (STEP 84).

Upon storage of the retrieval data into the title table 60, if the title storage arrangement stored in the area (k) of the binder management table 65 corresponding to the binder indicates "sequential", the CPU 34 stores the data in the order of registration. If this arrangement indicates "ISAM", the CPU 34 rearranges the data in the order of indexes, i.e., the order of the kana syllabary and then stores the rearranged data. If the title storage arrangement stored in the area (k) is "0", "sequential" is indicated. If this arrangement is "1", "ISAM" is indicated.

If the CPU 34 determines in STEP 82 that the location is the optical disk 21, it supplies the retrieval data stored in the main memory 38 to the optical disk unit 28 (STEP 85). The optical disk unit 28 updates and stores the supplied retrieval data in corresponding title and page tables 60 and 61 of the optical disk 21 (STEP 86).

Upon storage of the retrieval data into the title table 60, if the title storage arrangement stored in the area (k) of the binder management table 65 indicates "sequential", the CPU 34 stores the data in the order of registration. If this arrangement indicates "ISAM", the CPU 34 rearranges the data in the order of indexes, i.e., the order of the kana syllabary and then stores the rearranged data.

The CPU 34 checks the up-data attribute stored in the area (g) of the binder management table 65 corresponding to the binder (STEP 87). If the up-data attribute indicates "0" (immediate) or "2" (selective), the CPU 34 executes the following processing.

That is, if the CPU 34 determines in STEP 87 that the up-data attribute indicates "immediate", it determines a metabinder number in accordance with the stored content in the area (b) of the binder management table 65 (STEP 88), determines the location of the title table group 62 in accordance with the title table group presence/absence and location stored in the area (e) corresponding to the metabinder (STEP 89), determines the location of the page table group 63 in accordance with the page table group presence/absence and location stored in the area (f) corresponding to the metabinder (STEP 90), and enables data read/write operations for the title table group 62 and the page table group 63. Subsequently, the CPU 34 updates the stored contents in the title table group 62 and the page table group 63 in accordance with the updated contents in the title table 60 and the page table 61 (STEP 91).

Upon storage of the retrieval data into the title table group 62, if the title storage arrangement stored in the area (k) of the binder management table 65 corresponding to the metabinder indicates "sequential", the CPU 34 stores the data in the order of registration. If this arrangement indicates "ISAM", the CPU 34 rearranges the data in the order of indexes, i.e., the order of the kana syllabary and then stores the rearranged data.

If the CPU 34 determines in STEP 87 that the up-data attribute indicates "selective", it causes the CRT display unit 24 to guide whether the title table group 62 and the page table group 63 of the metabinder are to be simultaneously updated (STEP 92). If the operator selects "update" by the keyboard 23 in accordance with this guidance (STEP 93), the CPU 34 updates the title table group 62 and the page table group 63 of the corresponding metabinder (STEP 94). If the operator does not select "update" by the keyboard 23 in response to the guidance (STEP 93), the CPU 34 immediately finishes the processing.

Figure 15A:
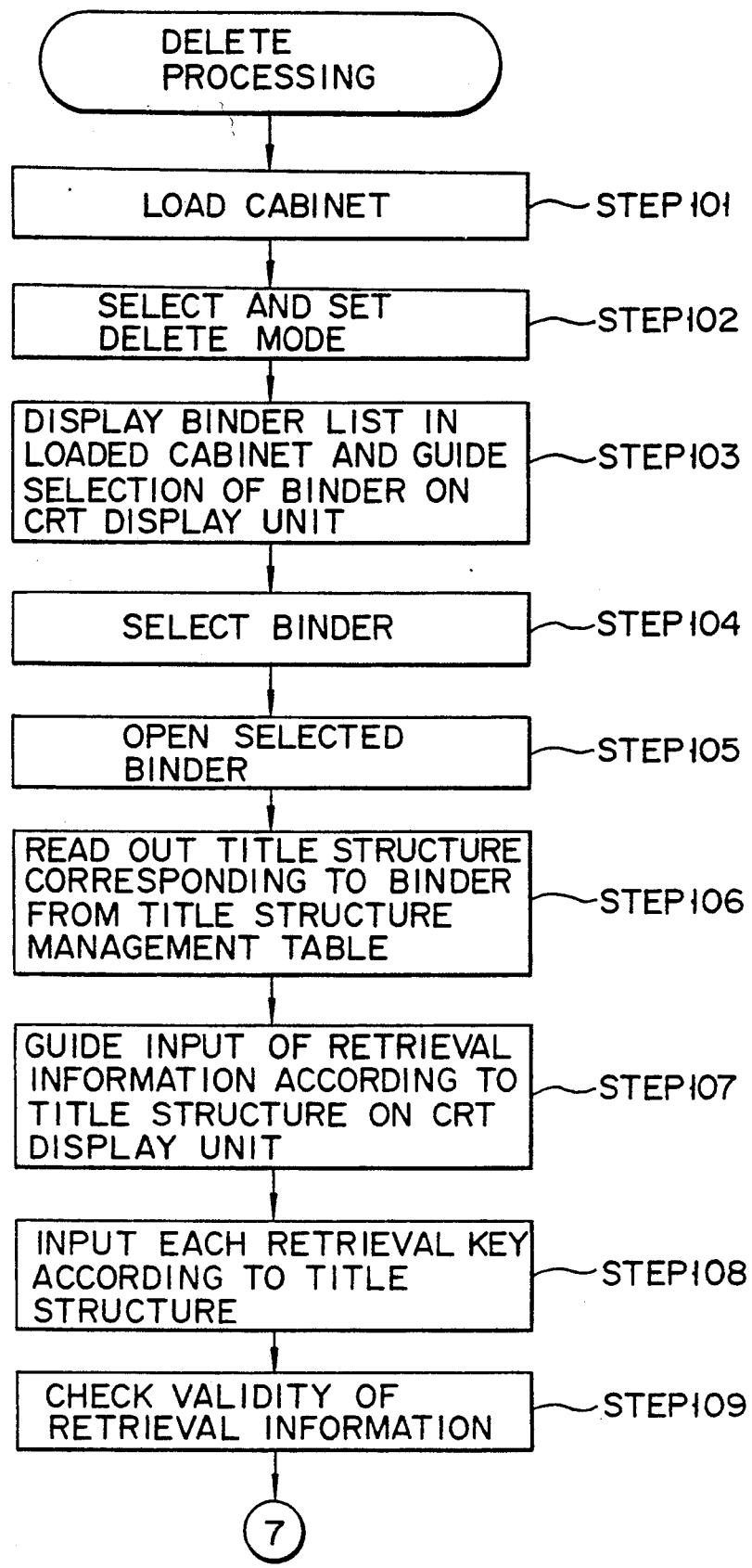
FIGS. 15A and 15B are flow charts illustrating a method of image delete processing of the host.
Figure 15B:
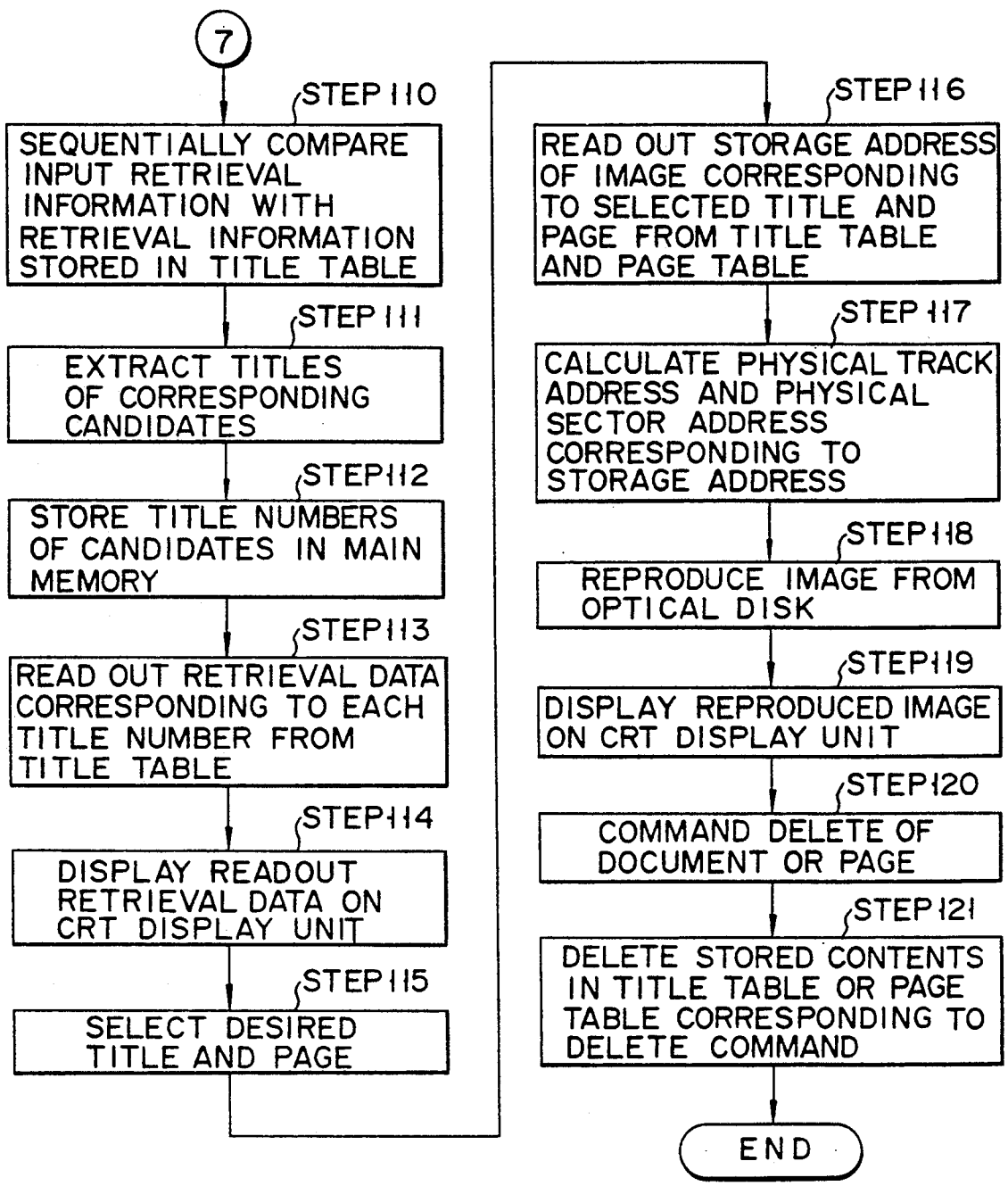

Image delete processing will be described below with reference to flow charts shown in FIGS. 15A and 15B. For example, while a menu screen is displayed on the CRT display unit 24, an operator loads a predetermined optical disk 20a (20b), i.e., a cabinet (STEP 101) and selects the delete mode by the keyboard 23 (STEP 102). The CPU 34 displays a binder list in the loaded cabinet on the CRT display unit 24 and guides selection of a binder (STEP 103). If the operator selects a binder by the keyboard 23 in accordance with this guidance (STEP 104), the CPU 34 opens the selected binder (STEP 105).

That is, the CPU 34 determines the location of the title table 60 in accordance with the title table presence/absence and location stored in the area (e) of the binder management table 65 corresponding to the binder, determines the location of the page table 61 in accordance with the page table presence/absence and location stored in the area (f) of the table 65, and enables data read/write operations for the title and page tables 60 and 61. If data in the area (e) is "1", the CPU 34 determines that the location is the magnetic disk 26. If the data is "2", the CPU 34 determines that the location is the optical disk 21.

Subsequently, the CPU 34 reads out a title structure corresponding to the binder from the title structure management table 64 (STEP 106) and causes the CRT display unit 24 to guide an input of retrieval information of an image to be retrieved by the readout title structure (STEP 107). In accordance with this guidance, the operator inputs each retrieval key according to the title structure by using the keyboard 23 (STEP 108). The CPU 34 checks validity of the input retrieval information in accordance with a format defined in advance (STEP 109).

In addition, the CPU 34 sequentially compares the input retrieval information with retrieval information stored in the title table 60 of the magnetic disk 26 or the optical disk 21 (STEP 110) and sequentially checks whether retrieval information which coincides with the input retrieval information is stored, thereby extracting corresponding titles (STEP 111). The CPU 34 stores title numbers of the extracted candidates in the main memory 38 (STEP 112), reads out retrieval data corresponding to the title numbers from the title table 60 of the magnetic disk 26 o the optical disk 21 (STEP 113), and displays the readout data on the CRT display unit 24 (STEP 114).

When the operator selects a desired title and a desired page by the keyboard 23 in accordance with the display (STEP 115), the CPU 34 reads out a storage address of an image corresponding to the selected title and page from the title table 60 and the page table 61 of the magnetic disk 26 or the optical disk 21 (STEP 116) and calculates a physical track address and a physical sector address corresponding to the storage address of the image (STEP 117). The optical disk unit 22a (22b) reproduces the image from the optical disk 20a (20b) in accordance with the calculated addresses (STEP 118).

That is, the CPU 34 supplies an image (compression information) of each scanning line from the optical disk unit 22a (22b) to the compressing/expanding circuit 50. These images are subjected to band expanding processing and sequentially supplied to the display memory 42. Therefore, the CPU 34 displays the image stored in the display memory 42 on the CRT display unit 24 (STEP 119).

If the operator checks the display and commands delete of a document or a page by the keyboard 23 (STEP 120), the CPU 34 deletes the stored contents in corresponding title and page tables 60 and 61 (STEP 121). The CPU 34 similarly processes these updated title and page tables 60 and 61 as in the registration processing.

Image retrieval processing will be described below with reference to flow charts shown in FIGS. 16A and 16B. For example, while a menu screen is displayed on the CRT display unit 24, an operator selects the retrieval mode by the keyboard 23 (STEP 131). The CPU 34 sequentially reads out metabinders having data "0" in the area (b) of the binder management table 65 and independent binders having data "−1" therein (STEP 132) and causes the CRT display unit 24 to display the readout metabinders and independent binders and guide selection between a metabinder and an independent binder (STEP 133). If the operator selects a metabinder by the keyboard 23 in accordance with this guidance (STEP 134), the CPU 34 opens the selected metabinder (STEP 135).

That is, the CPU 34 determines the location of the title table group 62 in accordance with the title table presence/absence and location stored in the area (e) of the binder management table 65 corresponding to the metabinder, determines the location of the page table group 63 in accordance with the page table presence/absence and location stored in the area (f), and enables data read/write operations for the title table group 62 and the page table group 63. If the data in area (e) or (f) is "1", the CPU 34 determines that the location is the magnetic disk 26. If the data is "2", the CPU 34 determines that the location is the optical disk 21.

The CPU 34 reads out the title structure corresponding to the metabinder from the title structure management table 64 (STEP 136) and causes the CRT display unit 24 to guide an input of retrieval information of an image to be retrieved in accordance with the readout title structure (STEP 137). In accordance with this guidance, the operator inputs each retrieval key according to the title structure by the keyboard 23 (STEP 138). The CPU 34 checks validity of the input retrieval information in accordance with a format defined beforehand (STEP 139).

The CPU 34 sequentially compares the input retrieval information with retrieval information stored in the title table group 62 of the magnetic disk 26 or the optical disk 21 (STEP 140), sequentially checks whether retrieval information which coincides with the input retrieval information is stored, and extracts corresponding titles (STEP 141). The CPU 34 stores title numbers of the extracted candidates in the main memory 38 (STEP 142), reads out retrieval data corresponding to the title numbers from the title table group 62 of the magnetic disk 26 or the optical disk 21 (STEP 143), and displays the readout data on the CRT display unit 24 (STEP 144). In this case, if the retrieval information are stored in the title table group 62 in accordance with the "ISAM", a retrieval time is shortened.

When the operator selects a desired title and a desired page by the keyboard 23 in accordance with the above display (STEP 145), the CPU 34 checks whether a cabinet corresponding to the selected title and page is loaded (STEP 146). If the CPU 34 determines that a corresponding cabinet is loaded, it reads out a storage address of the corresponding image from the title table group 62 of the magnetic disk 26 or the optical disk 21 (STEP 147) and calculates a physical track address and a physical sector address corresponding to the storage address of the image (STEP 148). The optical disk unit 22a (22b) reproduces the image from the optical disk 20a (20b) in accordance with the calculated addresses (STEP 149).

That is, the CPU 34 supplies an image (compression information) of each scanning line from the optical disk unit 22a (22b) to the compressing/expanding circuit 50. These images are subjected to band expanding processing and sequentially supplied to the display memory 42. As a result, the image stored in the display memory 42 is displayed on the CRT display unit 24 (STEP 150).

If the CPU 34 determines in STEP 146 that a corresponding cabinet is not loaded, it designates a cabinet name to be retrieved on the CRT display unit 24, thereby guiding the optical disk 20a (20b) to be loaded (STEP 151). If the operator loads the corresponding optical disk 20a (20b) in accordance with this guidance (STEP 152), the flow returns to STEP 146 to perform the same processing as performed when a cabinet is loaded.

If the CPU 34 determines in STEP 146 that a corresponding cabinet is not loaded, it may cause an auto changer (not shown) to load the corresponding optical disk 20a (20b) in the optical disk unit 22a (22b).

If the operator selects an independent binder in accordance with the guidance of selection between a metabinder and an independent binder in STEP 134, the retrieval processing is similarly performed as in the case of the metabinder by using the corresponding title and page tables 60 and 61 (STEP 153).

Figure 17:
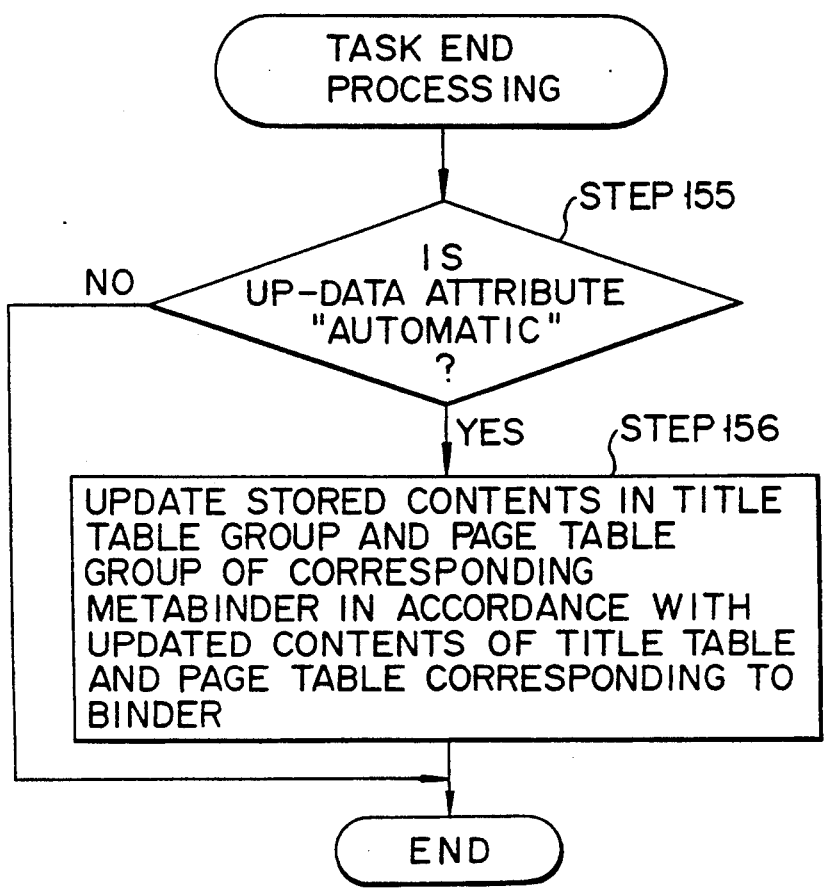
FIG. 17 is a flow chart illustrating a method of task end processing of the central control apparatus.

Task end processing will be described below with reference to a flow chart shown in FIG. 17. That is, if an operator commands to end the registration, delete, or retrieval processing by the keyboard 23 or at an arbitrary timing of the system such as a task end timing at which all the processing tasks are ended, the CPU 34 checks whether the up-data attribute stored in the area (f) of each binder of the binder management table 65 is set to "1" (automatic) (STEP 155). As a result, if the up-data attribute is set to "1" (automatic), the CPU 34 updates the stored contents in the title table group 62 and the page table group 63 of the corresponding metabinder in accordance with the updated contents of the title table 60 and the page table 61 corresponding to the binder (STEP 156). At this time, the storage locations and title storage arrangements of the title table 60, the page table 61, the title table group 62, and the page table group 63 are taken into consideration and stored.

If the up-data attribute is not "1" in STEP 156, the CPU 34 immediately finishes the processing.

Figure 18A:
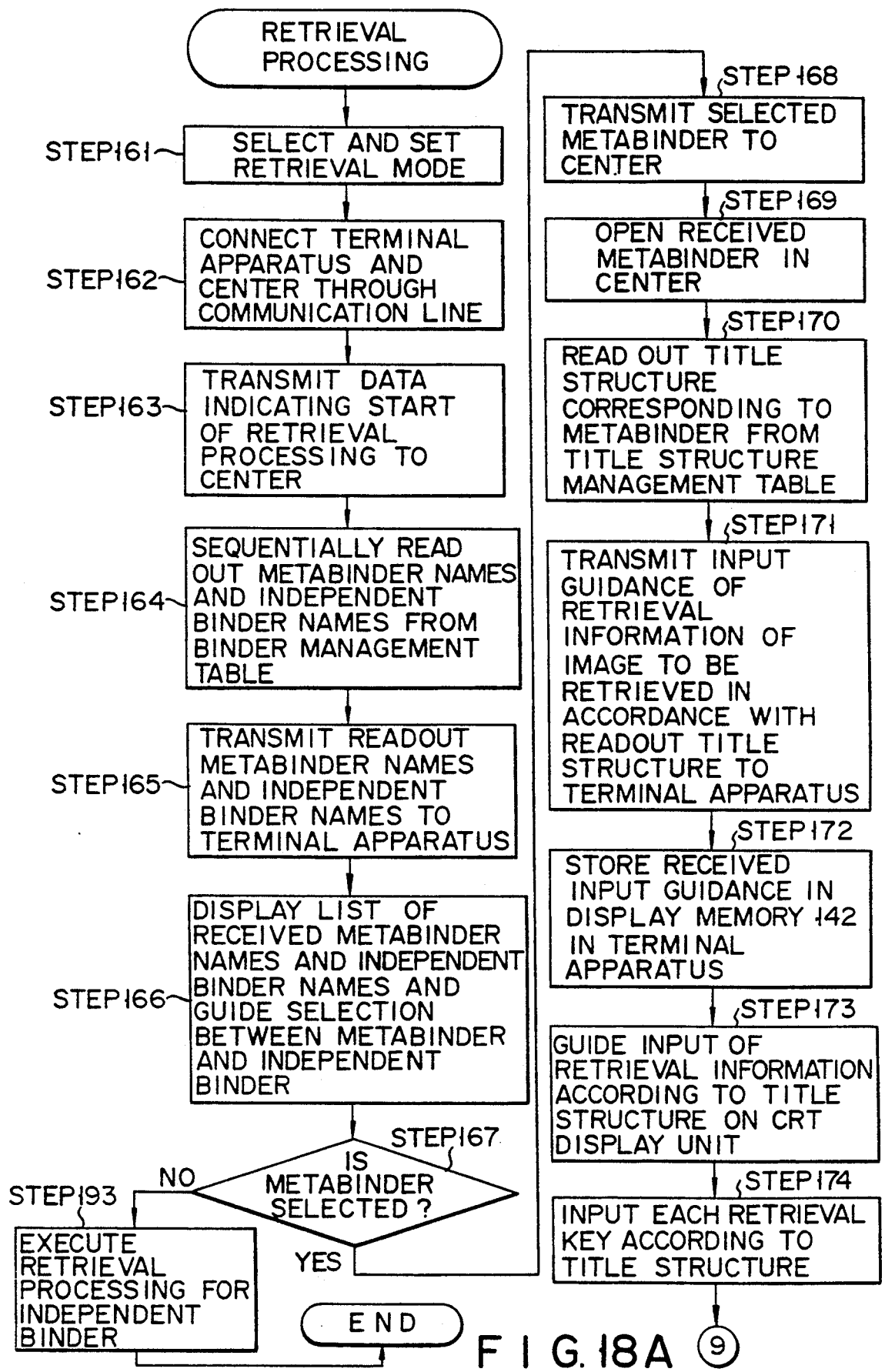
FIGS. 18A, 18B, and 18C are flow charts illustrating a method of retrieval processing performed by a terminal apparatus.
Figure 18B:
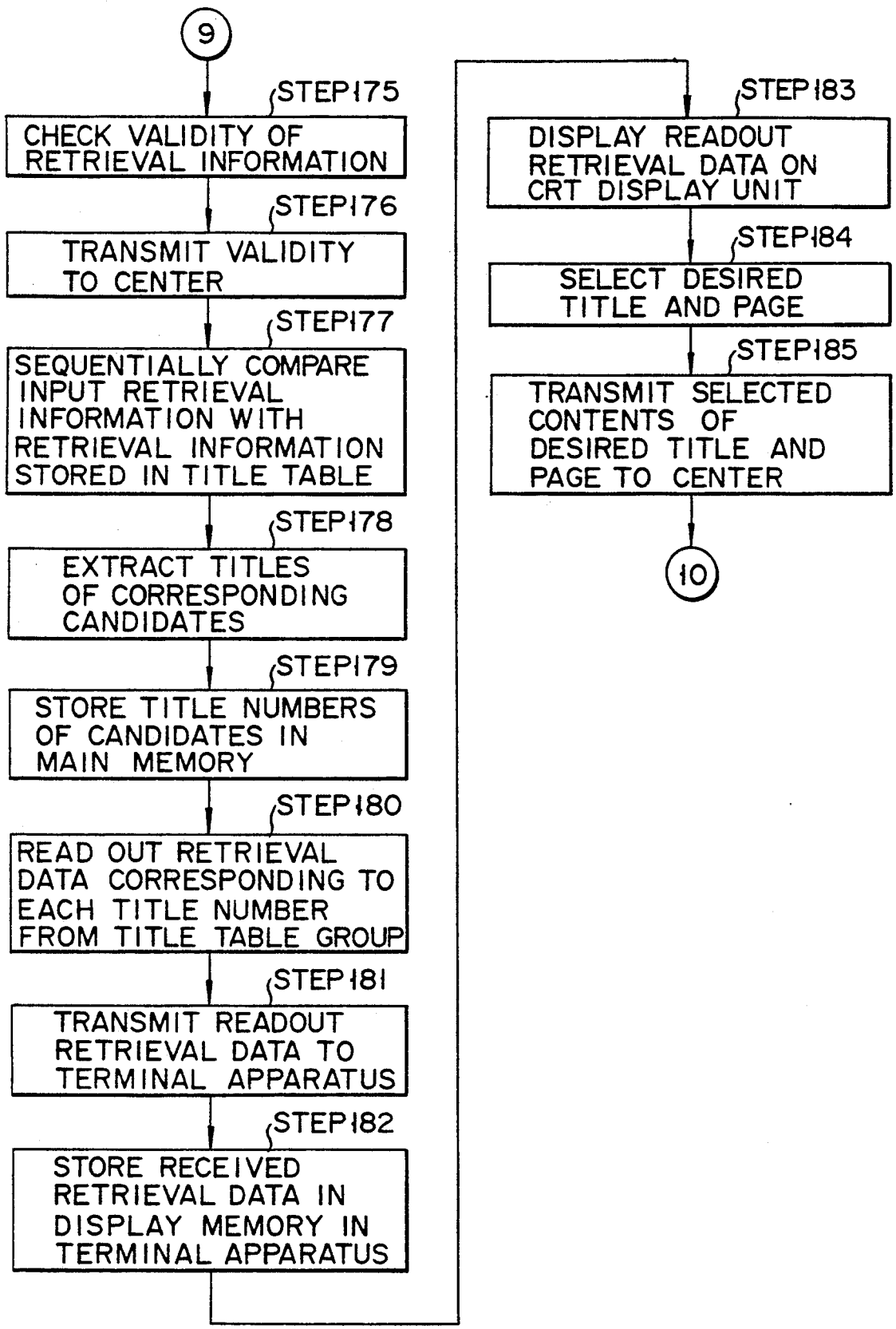
Figure 18C:
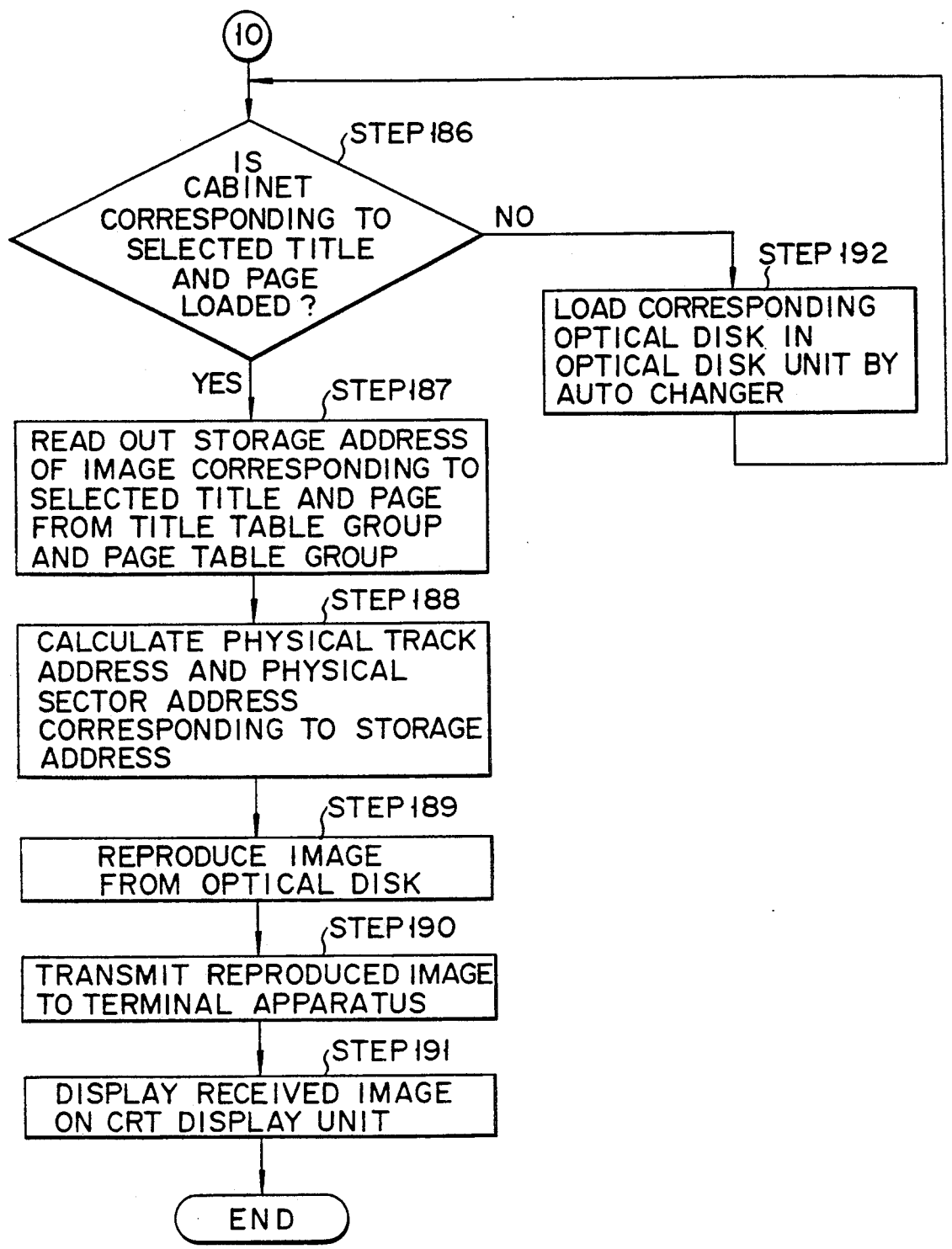

Image retrieval processing in the terminal apparatus 1a (1b, ...) will be described below with reference to flow charts shown in FIGS. 18A, 18B, and 18C. For example, while a menu screen is displayed on the CRT display unit 124 of the terminal apparatus 1a (1b, ...), an operator selects the retrieval mode by the keyboard 123 (STEP 161). The CPU 134 is connected to the CPU 34 via the communication control module 116, the communication line 2, and the communication module 16 (STEP 162), and data indicating the start of retrieval processing is transmitted from the CPU 134 to the CPU 34 (STEP 163). The CPU 34 sequentially reads out metabinders having data "0" in the area (b) of the binder management table 65 and independent binders having "−1" therein (STEP 164) and transmits a list of the readout metabinders and independent binders to the CPU 134 via the communication control module 16, the communication line 2, and the communication control module 116 (STEP 165). The CPU 134 displays the received metabinder and independent binder list on the CRT display unit 124 to guide selection between a metabinder and an independent binder (STEP 166). If the operator selects a metabinder by the keyboard 123 in accordance with this guidance (STEP 167), the CPU 134 transmits the selected metabinder name to the CPU 34 (STEP 168). The CPU 34 receives the selected metabinder name and opens the metabinder (STEP 169).

That is, the CPU 34 determines the location of the title table group 62 in accordance with the title table presence/absence and location stored in the area e of the binder management table 65 corresponding to the metabinder, determines the location of the page table group 63 in accordance with the page table presence/absence and location stored in the area (f), and enables data read/write operations for the title table group 62 and the page table group 63. If the data in the area (e) or (f) is "1", the CPU 34 determines that the location is the magnetic disk 26. If the data is "2", the CPU 34 determines that the location is the optical disk 21.

Subsequently, the CPU 34 reads out the title structure corresponding to the metabinder from the title structure management table 64 (STEP 170) and transmits a guidance of an input of retrieval information of an image to be retrieved by the readout title structure (STEP 171). The CPU 134 stores the received input guidance in the display memory 142 (STEP 172). The CPU 134 displays the input guidance of retrieval information of an image to be retrieved on the CRT display unit 124 (STEP 173). In accordance with this guidance, the operator inputs each retrieval key according to the title structure by the keyboard 123 (STEP 174). The CPU 134 checks validity of the input retrieval information in accordance with a format defined in advance (STEP 175). If the CPU 134 determines that the retrieval information is valid, the input retrieval information is output to the CPU 34 via the communication control module 116, the communication line 2, and the communication control module 16 (STEP 176).

The CPU 34 sequentially compares the retrieval information stored in the title table group 62 of the magnetic disk 26 or the optical disk 21 with the received retrieval information (STEP 177), sequentially checks whether retrieval information which coincides with the received retrieval information is stored, and extracts corresponding titles (STEP 178). The CPU 34 stores title numbers of the extracted candidates in the main memory 38 (STEP 179), reads out retrieval data corresponding to the title numbers from the title table group 62 of the magnetic disk 26 or the optical disk 21 (STEP 180), and transmits the readout data to the CPU 134 via the communication control module 16, the communication line 2, and the communication control module 116 (STEP 181). The CPU 134 stores the received retrieval data in the display memory 142 (STEP 182). The CPU 134 displays the retrieval data corresponding to the title numbers o the CRT display unit 124 (STEP 183). In this case, if the retrieval information is stored in the title table group 62 in accordance with the "ISAM", a retrieval time is shortened.

When the operator selects a desired title and a desired page by the keyboard 123 in accordance with the above display (STEP 184), the CPU 134 outputs the selected contents to the CPU 34 via the communication control module 116, the communication line 2, and the communication control module 16 (STEP 185). The CPU 34 checks whether a cabinet corresponding to the selected title and page is loaded (STEP 186). If the CPU 34 determines that the corresponding cabinet is loaded, it reads out a storage address of the corresponding image from the title table group 62 and the page table group 63 of the magnetic disk 26 or the optical disk 21 (STEP 187) and calculates a physical track address and a physical sector address corresponding to the storage address of the image (STEP 188). The optical disk unit 22a (22b) reproduces an image from the optical disk 20a (20b) in accordance with the calculated addresses (STEP 189).

That is, the CPU 34 supplies an image (compression information) of each scanning line from the optical disk unit 22a (22b) to the compressing/expanding circuit 50. These images are subjected to band expanding processing to obtain original images, and the original images are sequentially supplied to the page memory 40. When all the reproduced images of one page are stored in the page memory 40, the CPU 34 transmits the images to the terminal apparatus 1a (1b, . . .) which made an inquiry via the communication control module 16, the communication line 2, and the communication control module 116 (STEP 190). As a result, in the terminal apparatus 1a (1b, . . .), the CPU 134 causes the display memory 142 to display the images supplied via the communication control module 116 on the CRT display unit 124 (STEP 191).

If the CPU 34 determines in STEP 186 that corresponding cabinet is not loaded, it causes an auto changer (not shown) to load the corresponding optical disk 20a (20b) in the optical disk unit 22a (22b) (STEP 192). The flow returns to step 185, and the processing is similarly performed as in the case in which a cabinet is loaded from the beginning.

If the operator selects an independent binder in accordance with the guidance of selection between a metabinder and an independent binder, the retrieval processing is similarly performed as in the case of the metabinder by using the title table 60 and the page table 61 (STEP 193).

As described above, the terminal apparatus 1a (1b, . . .) can perform processing of retrieving an image from the optical disk 20a (20b) of the central control apparatus 3 while the center control apparatus 3 is executing registration, delete, or retrieval processing. Note that while the central control apparatus 3 is executing registration or delete processing, retrieval processing for a binder which is currently being subjected to the registration or delete processing is inhibited.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electronic filing system in which a single first apparatus and a plurality of second apparatuses are connected through communication lines, wherein said first apparatus registers and retrieves images, and wherein said second apparatuses retrieves the images from said first apparatus, said first apparatus comprising:

first storing means for storing a plurality of images in a first storing medium, with said images being classified according to documents and binders, wherein each document includes a collection of images corresponding to a plurality of pages, and wherein each binder includes a collection of documents;

second storing means for storing retrieval information in a first area of a second storing medium, said retrieval information being used for retrieving the images stored in the first storing medium in units of one document and having formats each of which is defined in units of one binder so that the retrieval information corresponding to documents included in each binder have an identical format;

third storing means for storing at least two retrieval information groups in a second area of the second storing medium, the first one of said retrieval information groups being a collection of retrieval information used for retrieving documents which are included in a plurality of binders whose retrieval information have the same format, the second one of said retrieval information groups being a collection of retrieval information used for retrieving a plurality of images included in one binder whose retrieval information differ in format from those of another binder;

first transmitting means for transmitting the retrieval information groups stored in the second area of the second storing medium to a first one of the second apparatuses;

retrieving means for retrieving an image from the first storing medium using the retrieval information in the first area of the second storing medium corresponding to retrieval data supplied from the first one of the second apparatuses;

designating means for designating a binder in which the image is to be stored;

first input means for inputting retrieval information in accordance with the format of the retrieval information of the binder designated by said designating means;

reading means for reading an image to be stored;

first processing means for causing the image read by the reading means to be stored in the first storing medium using the first storing means; and second processing means for causing the retrieval information input from the first input means to be stored in the first area of the second storing medium by use of the second storing means, and each of said second apparatuses comprising:

selecting means for selecting, using data which is supplied from the first apparatus, one retrieval information group from the retrieval information groups;

second input means for inputting retrieval information in accordance with the format of the retrieval information group selected by the selecting means; and second transmitting means for transmitting the retrieval information input by the second input means to the first apparatus.

2. A system according to claim 1, wherein said first storing medium comprises an optical disk.

3. A system according to claim 1, wherein said second storing medium comprises one of a magnetic disk and an optical disk.

4. A system according to claim 1, wherein said output means comprises one of a CRT display unit and a printing unit.

5. An electronic filling system in which a single first apparatus and a plurality of second apparatuses are connected through communication lines, said first apparatus registers and retrieves images and said second apparatuses retrieves the images from said first apparatus, wherein said first apparatus comprises:

first storing means for storing a plurality of images in a first storing medium, said images being classified according to documents and binders, each document being a collection of images corresponding to a plurality of pages, and each binder being a collection of documents;

second storing means for storing retrieval information in a first area of a second storing medium, said retrieval information being used for retrieving the images stored in the first storing medium in units of one document and having formats each of which is defined in units of one binder so that retrieval information for documents included in the same binder have an identical format;

third storing means for storing retrieval information groups in a second area of the second storing medium, one of said retrieval information groups includes a collection of retrieval information used for retrieving documents which are included in a plurality of binders whose retrieval information are the same in format, and another one of said retrieval information groups includes a collection of retrieval information used for retrieving a plurality of images included in one binder whose retrieval information differ in format from those of another binder;

fourth storing means for storing format data in a third area of the second storing medium, said format data including data on the formats of the retrieval information which are stored in the first area of the second storing medium in units of one binder, and data on formats of the retrieval information which are stored in the second area of the second storing medium in units of one of the retrieval information groups;

first receiving means for receiving a retrieval start instruction from a first one of the second apparatuses;

first transmitting means, responsive to the retrieval start instruction from the first one of the second apparatuses, for transmitting the retrieval information groups stored in the second area of the second storing medium to the first one of the second apparatuses;

second receiving means, responsive to the first transmitting means, for receiving a retrieval information group-selecting instruction from the first one of the second apparatuses;

first readout means, responsive to the retrieval information group-selecting instruction received by the second receiving means, for reading out the format data on the retrieval information group selected by the retrieval information group-selecting instruction from the third area of the second storing medium;

second transmitting means for transmitting the format data read out by the first readout means to the first one of the second apparatuses;

third receiving means for receiving retrieval information which is supplied from the first one of the second apparatuses in response to transmission performed by the second transmitting means;

retrieving means for retrieving an image from the first storing medium by use of the retrieval information received by the third receiving means;

first instructing means for instructing a start of storage of an image and for designating a binder in which the image is to be stored;

second readout means for reading out, from the third area of the second storing medium, format of the retrieval information of the binder designated by said designating means;

first input means for inputting retrieval information in accordance with the format of the retrieval information of the binder designated by said designating means;

reading means for reading an image to be stored;

first processing means for causing the image read by the reading means to be stored in the first storing medium by use of the first storing means; and second processing means for causing the retrieval information input from the first input means to be stored in the first area of the second storing medium by use of the second storing means, and wherein each of said second apparatuses comprises:

second instructing means for issuing an image retrieval instruction;

third transmitting means for transmitting the image retrieval instruction issued by the second instructing means to the first apparatus;

fourth receiving means for receiving the retrieval information groups in response to transmission performed by the third transmitting means;

third instructing means for issuing the retrieval information group-selecting instruction for selecting one retrieval information group from the retrieval information groups received by the fourth receiving means;

fourth transmitting means for transmitting the instruction issued by the third instructing means to the first apparatus;

fifth receiving means for receiving format of the data retrieval information group, which format is supplied from the first apparatus in response to transmission performed by the fourth transmitting means;

second input means for inputting retrieval information in accordance with the format received by the fifth receiving means; and fifth transmitting means for transmitting the retrieval information input by the second input means to the first apparatus.

6. An electronic filing system in which a single first apparatus and a plurality of second apparatuses are connected through lines, said first apparatus registers and retrieve images, and each of said second apparatuses retrieves the images from said first apparatus, wherein said first apparatus comprises:

first storing means for causing a plurality of images, classified according to documents and binder, to be stored in a first storage medium, each document including a collection of pages and each binder including a collection of documents;

second storing means for causing retrieval information and retrieval data to be stored in a first area of a second storage medium in units of one binder, said retrieval information including retrieval keys used for searching for the images stored in the first storage medium, said retrieval data representing a location where the images are stored in the first storage medium, and wherein the number of said retrieval keys are defined in each binder;

third storing means for causing a first and a second retrieval information group to be stored in a second area of the second storage medium, the first retrieval information group being a collection of retrieval information corresponding to binders which define the same number of retrieval keys and the second retrieval information group being a collection of retrieval information corresponding to binders which define different numbers of retrieval keys;

fourth storing means for causing retrieval key number data and retrieval key content data to be stored in a third area of the second storage medium, said retrieval key number data including data on the number of retrieval keys included in the retrieval information stored in the first and second areas of the second storage medium, and said retrieval key content data including data on the contents of the retrieval keys included in the retrieval information stored in the first and second areas of the second storage medium;

first receiving means for receiving a retrieval start instruction from a first one of the second apparatuses;

first transmitting means, responsive to the retrieval start instruction received by the first receiving means, for transmitting data on the retrieval information groups stored in the second area of the second storage medium to the first one of the second apparatuses;

second receiving means, responsive to the first transmitting means, for receiving a retrieval information group-selecting instruction and a retrieval key corresponding to a desired image from the first one of the second apparatuses;

first readout means for comparing the retrieval key received by the second receiving means with the retrieval information group stored in the second area of the second storage medium and corresponding to the retrieval information group-selecting instruction, and for reading out, from the second area of the second storage medium, retrieval information corresponding to the retrieval key received by the second receiving means;

second transmitting means for transmitting the retrieval information read out by the first reading means to the first one of the second apparatuses;

third receiving means, responsive to the second transmitting means, for receiving selected retrieval information from the first one of the second apparatuses;

retrieval means, responsive to the third receiving means, for retrieving, from said first storage medium an image shown on a page of a document corresponding the retrieval information;

third transmitting means for transmitting the image retrieved by the retrieval means to the first one of the second apparatuses;

first instructing means for instructing a start of storage of an image and a binder in which the image is to be stored;

second readout means for reading out, from the third area of the second storage medium, data on the number of retrieval keys included in the retrieval information of the binder instructed by the first instructing means;

first input means for inputting retrieval information corresponding to the number of retrieval keys read out by the second reading means;

reading means for reading an image to be stored;

first processing means for causing the image read by the reading means to be stored, using the first storing means, in the first storage medium in units of one document; and second processing means for causing storage position data and the retrieval information input from the first input means to be stored, using the second storing means, in the first area of the second storage medium, said storage position data representing where in the first storage medium the image subjected to processing by the first processing means is stored, and wherein each of said second apparatuses comprises:

second instructing means for issuing an image retrieval instruction;

fourth transmitting means for transmitting the image retrieval instruction issued by the second instructing means to the first apparatus;

fourth receiving means for receiving data on each of the retrieval information groups, which data is supplied from the first apparatus in response to transmission performed by the fourth transmitting means;

second input means for instructing selection of one of the retrieval information groups on the basis of the data received by the fourth receiving means, and for inputting a retrieval key;

fifth transmitting means for transmitting to the first apparatus retrieval information selected by the second input means;

fifth receiving means, responsive to the fifth transmitting means, for receiving retrieval information from the first apparatus;

selecting means for selecting one of the retrieval information received by the fifth receiving means;

sixth transmitting means for transmitting retrieval information selected by the selecting means to the first apparatus;

sixth receiving means, responsive to the sixth transmitting means, for receiving an image from the first apparatus; and output means for outputting the image received by the sixth receiving means.

7. An electronic filing system according to claim 6, wherein said first area of the second storage medium stores data on the number of retrieval keys contained in the retrieval information and stores data representing whether the retrieval keys are numbers, English characters, or kanji characters.

8. An electronic filing system according to claim 6, wherein said second storage medium has a fourth area for storing data representing whether the retrieval information groups stored in the second area of the second storage medium should be updated immediately when an image is stored in a predetermined binder of the first storage medium and the storage contents of the first area of the second storage medium of the first apparatus is updated, whether the retrieval information groups should be updated at a predetermined time, or whether the retrieval information groups should be updated in response to an update instruction, said electronic filing system further comprising:

updating means for updating the retrieval information groups stored in the second area of the second storage medium, wherein said retrieval information groups is updated when the data stored in the fourth area of the second storage medium represents immediate updating, and wherein said retrieval information groups are updated when the data stored in the fourth area of the second storage medium represents updating at the predetermined time, and wherein said retrieval information groups are updated in response to the update instruction when the data stored in the fourth area of the second storage medium represents updating responding to the update instruction.

9. An electronic filing system according to claim 8, wherein said second storage medium includes an optical disk and a magnetic disk, each of said optical and magnetic disks have first and second areas, said first and second areas of at least one of the optical and magnetic disks are used according to the binders and retrieval information groups, and wherein said magnetic disk has a third area for storing data representing which one of the optical disk or the magnetic disk has the first and second areas used according to the binders and the retrieval information groups.

10. An electronic filing system according to claim 8, further comprising updating means for updating the number and contents of the retrieval keys of the retrieval information of each of the retrieval information groups stored in the third area of the second storage medium, and wherein said fourth area of the second storage medium stores data representing whether the number and contents of the retrieval keys of the retrieval information of each of the retrieval information groups can be updated, and, if updating is possible, representing whether the number and contents of the retrieval keys of the retrieval information of each of the retrieval information groups should be updated automatically or selectively.

11. An electronic filing system according to claim 10, further comprising means for updating the number and contents of the retrieval keys of the retrieval information with respect to binders wherein the number and contents of the retrieval keys of the retrieval information are the same before updating, said means updating the number and contents of the retrieval keys when the number and contents of the retrieval information of each of the retrieval information groups are updated automatically.

12. An electronic filing system according to claim 6, wherein said first apparatus comprises:

third instructing means for instructing deletion of an image and indicating the binder in which the image to be deleted is stored;

third input means for inputting retrieval information corresponding to the number of retrieval keys of the retrieval information read out by the second readout means;

third readout means for comparing the retrieval information input by the third input means with the retrieval information stored in the first area of the second storage medium and corresponding to the binder, and for reading out, from the first area of the second storage medium, retrieval information corresponding to the received retrieval information;

second output means for outputting said retrieval information read out by the third readout means;

fourth instructing means for instructing selection of retrieval information to be deleted from the retrieval information read out by the third readout means; and deleting means for deleting, responsive to an instruction from the fourth instructing means, retrieval information and its storage position data from the first area of the second storage medium.

13. An electronic filing system according to claim 6, wherein said first apparatus receives a selection instruction for selecting the retrieval information groups supplied from the second apparatuses in response to transmission performed by the first transmitting means, reads out the number of retrieval keys contained in retrieval information groups selected in accordance with the selection instruction from the third area of the second storage medium, and transmits the number of retrieval keys contained in the readout retrieval information groups to the second apparatuses, and wherein said second apparatuses transmit one retrieval information group input by the second input means to the first apparatus, receive the number of retrieval keys of retrieval information groups supplied from the first apparatus in response to transmission of said one retrieval information, and input retrieval information corresponding to the number of retrieval keys received.

* * * * *